United States Patent

[11] 3,596,254

[72] Inventors Wilbur H. Highleyman
Mountain Lakes;
Anthony V. Deja, Towaco; Willard A. Dix, Chester; Joseph P. Shaw, Ringwood; Edmund R. Niedzwiecki, Haledon, all of, N.J.

[21] Appl. No. 820,362
[22] Filed Apr. 30, 1969
[45] Patented July 27, 1971
[73] Assignee Data Trends, Inc.
Parsippany, N.J.

[54] DATA PROCESSING WITH CONTROLLED INPUT
53 Claims, 16 Drawing Figs.

[52] U.S. Cl. 340/172.5
[51] Int. Cl. G06f 3/04
[50] Field of Search 340/172.5; 235/157

[56] References Cited
UNITED STATES PATENTS

| | | | |
|---|---|---|---|
| 2,910,238 | 10/1959 | Miles et al. | 340/172.5 |
| 3,145,295 | 8/1964 | Weighton et al. | 340/172.5 |
| 3,210,733 | 10/1965 | Terzian et al. | 340/172.5 |
| 3,281,797 | 10/1966 | Harris | 340/172.5 |
| 3,283,308 | 11/1966 | Klein et al. | 340/172.5 |
| 3,302,189 | 1/1967 | Korkowski et al. | 340/174 |
| 3,293,612 | 12/1966 | Ling | 340/172.5 |
| 3,335,407 | 8/1967 | Lange et al. | 340/172.5 |
| 3,340,354 | 9/1967 | Lodenkamp | 178/4 |

*Primary Examiner*—Gareth D. Shaw
*Attorney*—Morgan, Finnegan, Durham and Pine

ABSTRACT: Disclosed herein is a data processing system for generating and organizing input data according to a predetermined format and for coupling the resultant message to a transmission network. The illustrative system employs one or more input terminal stations, each equipped with data and function keyboards, format guidance indicators, a local hard copy printer and an alarm system. The system also includes a control unit constituting a digital computer which controls the overall system including message transmission, coordination of the stations, and the operations at each station such that (a) the operator is directed to follow a predetermined format defined by the operations of the format guidance indicators, (b) the functions produced by key manipulation are controlled, (c) the message to be transmitted is printed for visual verification before transmission, and (d) departures from the format actuate an alarm system and preclude message transmission. The system also includes line units which interface the control unit with the stations and with the transmission network.

INVENTORS
WILBUR H. HIGHLEYMAN
ANTHONY Y. DEJA
WILLARD A. DIX
JOSEPH P. SHAW
EDMUND R. NIEDZWIECKI

BY Morgan, Finnegan, Durham & Pine
ATTORNEYS

INVENTORS
WILBUR H. HIGHLEYMAN
ANTHONY V. DEJA
WILLARD A. DIX
JOSEPH P. SHAW
EDMUND S. NIEDZWIECKI
BY
Morgan, Finnegan, Durham & Pine INVENTORS
WILBUR H. HIGHLEYMAN
ANTHONY V. DEJA
WILLARD A. DIX
BY JOSEPH P. SHAW
EDMUND R. NIEDZWIECKI Morgan, Finnegan, Durham & Pine
ATTORNEYS INVENTORS
WILBUR H. HIGHLEYMAN
ANTHONY V. DEJA
WILLARD A. DIX
BY JOSEPH P. SHAW
EDMUND R. NIEDZWIECKI Morgan, Finnegan, Durham & Pine
ATTORNEYS INVENTORS
WILBUR H. HIGHLEYMAN
ANTHONY V. DEJA
WILLARD A. DIX
BY JOSEPH P. SHAW
EDMUND R. NIEDZWIECKI
Morgan, Finnegan, Durham & Pine
ATTORNEYS INVENTORS
WILBUR H. HIGHLEYMAN
ANTHONY V. DEJA
WILLARD A. DIX
JOSEPH P. SHAW
EDMUND R. NIEDZWIECKI BY Morgan, Finnegan, Durham & Pine
ATTORNEYS INVENTORS
WILBUR H. HIGHLEYMAN
ANTHONY V. DEJA
WILLARD A. DIX
JOSEPH P. SHAW
EDMUND R. NIEDZWIECKI BY Morgan, Finnegan, Durham & Pine
ATTORNEYS INVENTORS
WILBUR H HIGHLEYMAN
ANTHONY V. DEJA
WILLARD A DIX
JOSEPH P SHAW
EDMUND R NIEDZWIECKI BY Morgan, Finnegan, Durham & Pine
ATTORNEYS INVENTORS
WILBUR H. HIGHLEYMAN
ANTHONY V. DEJA
WILLARD A. DIX
JOSEPH P. SHAW
EDMUND R. NIEDZWIECKI BY Morgan, Finnegan, Durham & Pine
ATTORNEYS INVENTORS
WILBUR H. HIGHLEYMAN
ANTHONY V. DEJA
WILLARD A. DIX
JOSEPH P. SHAW
EDMUND R. NIEDZWIECKI
BY Morgan, Finnegan, Durham & Pine
ATTORNEYS

DATA PROCESSING WITH CONTROLLED INPUT

This invention relates to data processing and more particularly to the generation and organization of data to be transmitted over a data transmission network from an input terminal.

Such systems are widely used and of variable configuration. Each type has advantages and disadvantages controlling its suitability for particular applications.

In this connection, there are a number of commercial operations where message traffic density is high, and where message accuracy and format is of more than ordinary importance. An example is in stock market exchanges.

Buy and sell orders sent from the Broker to the Exchange must be accurate with respect to stock identification, number of shares, and price. There are in addition many qualifying conditions to the order, e.g., "sell short," "buy on a minus tick," "execute order at limit price," etc. Exchanges have as many as 30 qualifying conditions, any one of which (and sometimes several) may be involved in the transaction.

In addition to the foregoing, a number of exchanges require that the order be described according to a prescribed format.

When all the variables (price, number of shares, qualifying conditions, stock identification, etc.) are considered, together with the need for format control and minimization of error, it is readily seen that s system utilizing known techniques for generating and communicating these orders invites a great deal of complexity.

On the other hand, there are limitations due to space and cost requirements associated with the Brokerages, which preclude a complicated system.

It is accordingly an object of the invention to provide an essentially simple system for generating and organizing data according to a predetermined format for communication over a transmission network.

A further object of the invention is to provide such a system which is particularly adapted to the needs of stock exchange systems and the like.

A still further object of the invention is to provide such a system with controlled data display techniques for guiding message format.

Another object of the invention is to provide such a system with automatic error detecting and control functions.

A still further object of the invention is to provide such a system wherein equipment simplifications are effected through the use of keys controlled to provide any one of a number of functions.

Another object of the invention is to provide such a system wherein the message to be transmitted is presented to the operator for review and verification prior to transmission.

A further object of the invention is to provide such a system which is capable of silent operation.

A still further object of the invention is to provide such a system that is compact and therefore suitable for desk-top location and operation.

Another object of the invention is to provide such a system wherein is provided a hard copy record of messages transmitted and errors made.

A further object of the invention is to provide such a system wherein the data display techniques in conjunction with the data entry facilities essentially teach the operator how to successfully manipulate the system.

A still further object of the invention is to provide such a system wherein the operator need not be trained in the operation of a teletypewriter although the transmitted data is in teletypewriter format.

Another object of the invention is to provide such a system wherein the stations may be remotely located from the control unit but connected via a communication network.

A further object of the invention is to provide such a system which permits the composing of complex messages with a minimum of key strokes and a minimization of error possibilities.

A still further object of the invention is to provide such a system wherein simplified data entry techniques permit communication with devices requiring much more exotic input data.

These and other objects and advantages of the invention will become apparent in the description which follows and in the practice of the invention.

Serving to illustrate an exemplary embodiment of the invention are the drawings of which:

The illustrative embodiment takes the form of an Order and Report Terminal for use in a Stock Exchange system.

The system is designed to facilitate the direct entry of orders and reports into an existing wire network of a brokerage firm or an exchange. Complete format guidance and error control is provided for the user through a novel conversational technique, resulting in properly formatted messages with a minimum of operator training. The terminal may communicate over a point-to-point circuit or may connect into a wire network as another drop. In either event, it reacts to the network as if it were another teletypewriter.

GENERAL DESCRIPTION

Figure 1:
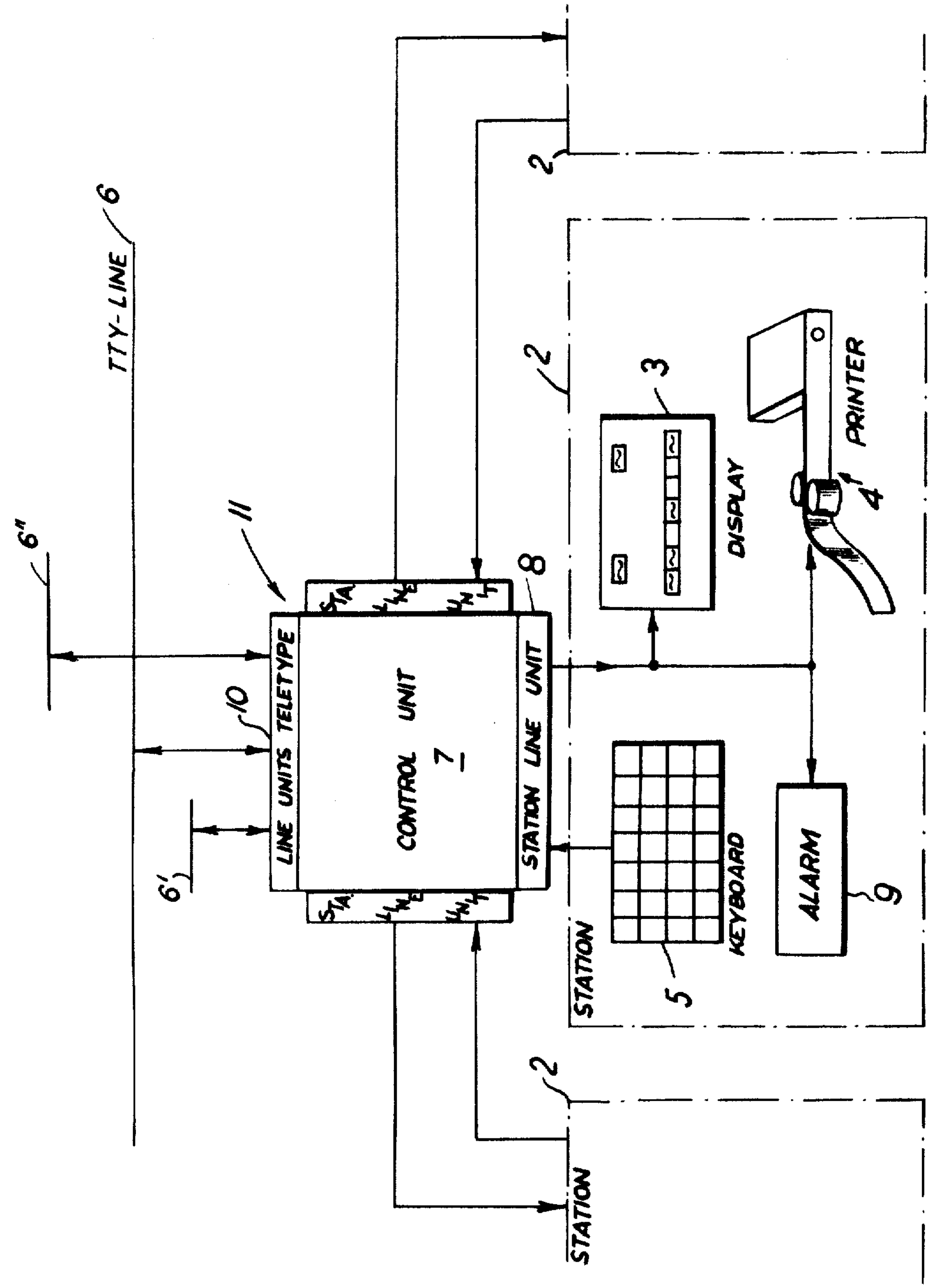
FIG. 1 is a general block diagram showing the organization of the stations relative to the control unit and transmission network.

FIG. 1 depicts the Terminal System which comprises a controller 1 consisting of a control unit 7 and one or more line units 8, and up to eight stations 2. In FIG. 1, station 2 is connected to a station line unit 8 so as to permit data transfer from keyboard 5 to line unit 8 and from line unit 8 to display 3, printer 4 and alarm 9. Other station line units are similarly connected to additional stations. A teletypewriter line unit 10 is connected to transfer data from control unit 7 to teletype (TTY) line 6.

A typical station 2 allows the entry of messages under strict format guidance and error control. This is done by a series of displays 3 that are presented to the user as he enters the data, and a continual monitoring of his entered data for validity. As the user enters data, the controller 1 checks each character to make sure that it is valid. If it is, it returns an appropriate local copy to the station's printer 4 (which may print several characters, e.g., "MKT" for one key depression), stores a proper character or character sequence in a message buffer, and modifies the displays 3 if necessary to indicate to the user the next allowable choice of entries.

When a message has been completely entered, the user verifies it by inspection of the hard copy produced by printer 4, and depresses a "Transmit" key which is part of keyboard 5. Controller 1 will then queue the message for transmission over the communication network 6.

It should be noted that the controller 1 takes care of all the details of proper message format. It enters all carriage return-line feed combinations, spaces (except for certain cases, such as spaces within stock symbols), numeric and alphabetic characters, and so on. It also automatically enters the terminal (branch or firm) identification and message sequence number. None of these items need concern the user.

Provisions are included to receive messages from the wire network and route them to a designated station. These messages might be format error messages or execution reports.

Complete communication housekeeping is maintained by the use of message sequence numbers. The station printer 4 will print the message sequence number of each message as it is transmitted, so that the user has a complete record of all messages and their transmission status.

Not only can the controller 1 connect into any type of wire network, whether low or high speed, Baudot (5-bit code) or ASCII (another code), polled or point-to-point, but the stations themselves can also be remote from controller 1. In this case, the station is connected to the controller 1 via a dedicated (nonpublic) 110 baud (bits/sec) line. Controller 1 can handle any mix of local and remote stations up to its maximum of eight stations.

The station is a compact unit and is approximately 9 inches high, 10 inches deep and 14 inches wide and weighs less than 20 pounds. The control unit is approximately 8 inches by 18 inches by 24 inches and weighs less than 50 pounds.

The Station—General Description

Figure 2A:
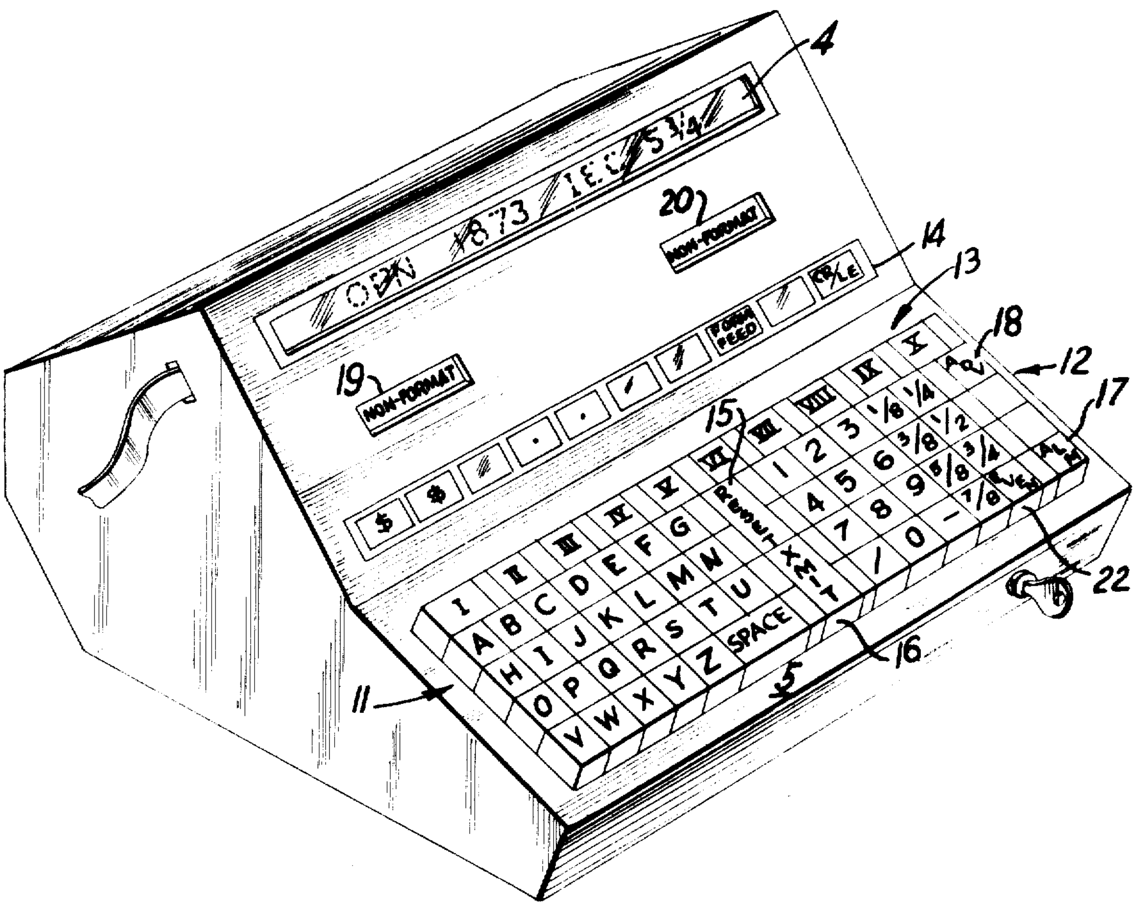
FIG. 2A is a perspective drawing illustrating an exemplary station configuration.
Figure 2B:
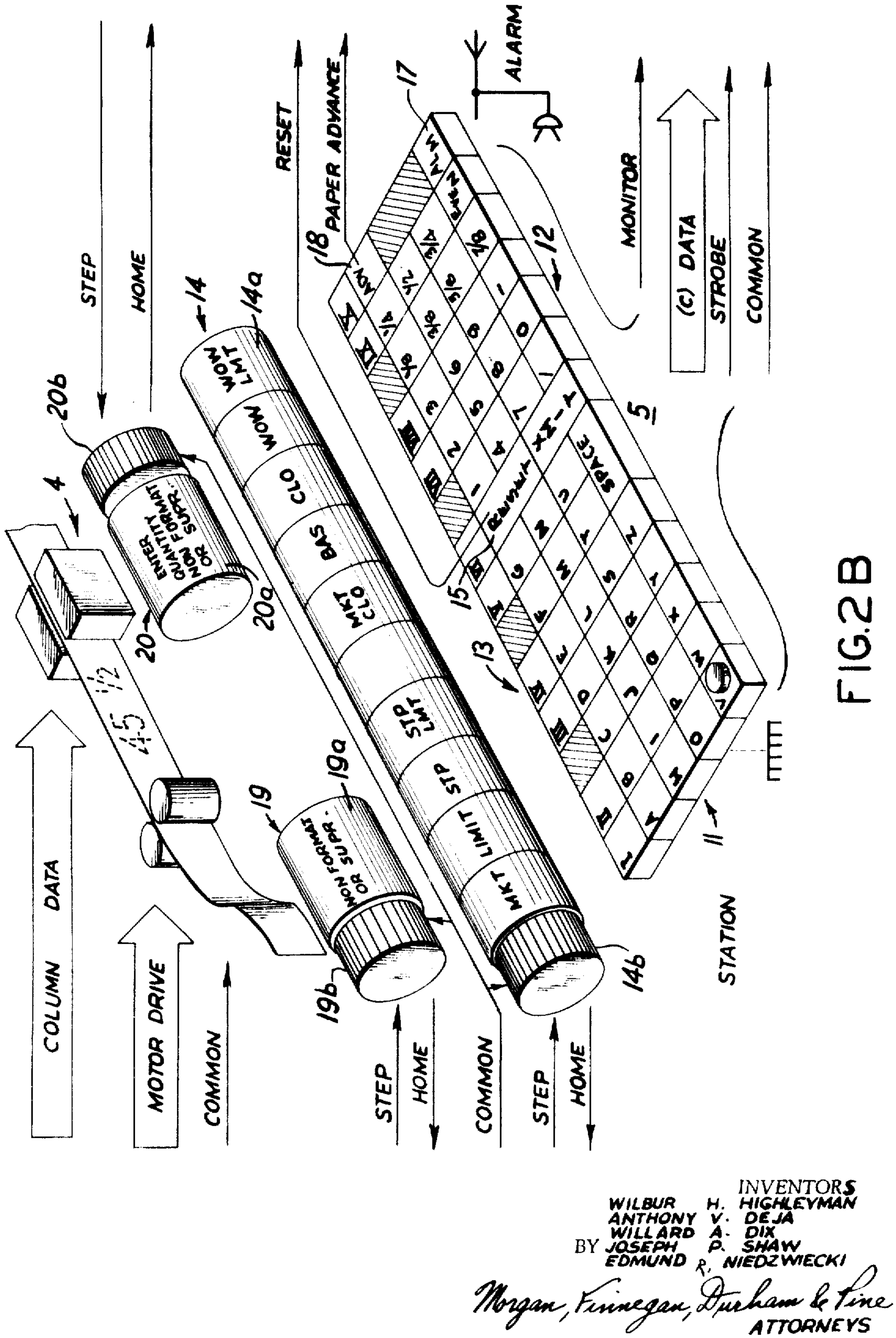
FIG. 2B is a perspective and schematic diagram illustrating further details of a station.

An illustration of the Station is shown in FIGS. 2A, 2B. It is composed of three major elements.

The Keyboard

The keyboard shown in FIGS. 2A, 2B is designed for both order and report functions. It contains an alphabetic section 11 on the left, a numeric section 12 with fractions on the right, and 10 function keys 13 along the top. The meaning of the function keys 13 is defined by the display 14. The displays change as the message entry progresses.

There is also a reset key 15 (RESET) for erasing an erroneous message and reinitializing the station displays and logic, a transmit key 16 (XMIT) for releasing a properly completed message to the line, and an alarm indicator (ALM) 17 for indicating an error. When a format error is detected, the alarm 17 will light, and an audible alarm will sound. These indications are cleared by the depression of "reset" key 15.

The keyboard is an electronic keyboard that may be silent in operation or can include an optional clicker to give the operator the audible sensation of a mechanical keyboard.

The keyboard can also be arranged in other ways, such as a standard 3- or 4-row teletypewriter keyboard, should this prove advantageous in a particular installation.

The Printer

An electronic strip printer 4 records all data as it is entered into the station. The depression of one of the function keys 13 will cause the entire associated word(s) to be printed (such as MKT, STP, LMT).

In addition to the message data, the printer 4 will also automatically print the message sequence number when that message is transmitted over the communication line. Thus, a complete log of all messages is maintained, with clear indications of which were transmitted.

TABLE I

| I | II | III | IV | V | VI | VII | VIII | IX | X | |
|---|---|---|---|---|---|---|---|---|---|---|
| | | | | | | | | | | 1 |
| NON FORMAT | | | SL | | | QL | | | SUPER | |
| POSS DUPE | CXL | | BUY | SL | S SHRT | S SHRT EXEMPT | | BUY MINUS | SL PLUS | |
| | | | | | | | | | | |
| PR | CT | CV | RT | CL | WI | WD | WW | XW | ADV | |
| MKT | LIMIT | MIT | STP LMT | | MKT CLO | BAS | CLO | WOW | WOW LMT | 6 |
| OC | FOK | OPG | | GA_ | GT_ | GTW | GTM | GTC | DAY ADV | 7 |
| | | AM | | PM | | | | | END DATE (ADV) | 8 |
| LVS_ | AON | NH | DNR | | CASH | ND | SELLER | | ADV | |
| SW | | OR | | CXL | | CXL PRIOR ONLY | | | ADV | 10 |
| CORR 4 | ACCT NO 15 | NO SHRS 5 | | MISC 27 | | GU 4 | | CFN 15 | | 11 |
| $ | & | | | | | | FORM FEED | | CR/LF | 12 |

ORDER STATION

FUNCTION DISPLAY ASSIGNMENTS

TABLE II

| Alphabetic display 19 Legend | Numeric display 20 Legend |
|---|---|
| | |
| ERROR | REPORT IN PROGRESS |
| REPORT IN PROGRESS | |
| | NONFORMAT OR SPUR |
| NONFORMAT OR SPUR | ENTER QUANTITY |
| | |
| ENTER STOCK SYMBOL | ENTER STP PRICE |
| | ENTER LMT PRICE |
| | ENTER TIME OR DATE |
| | ENTER QUANTITY |
| | ENTER NO. OF DAYS |
| | ENTER PRICE |

ALPHABETIC AND NUMERIC DISPLAY ASSIGNMENTS

In the event of a format error, the last character entered (the character in error) is preferably printed out for operator guidance. Since the function keys 13 illustratively bear Roman numeral legends, a function key error is printed as the associated Roman numeral.

The printer 4 is an electronic device that has only one moving part, the paper advance mechanism. Characters are printed in matrix form in a large, legible style by electrolytically marking the paper as it passes through the print head.

The Displays

It is the displays that give the station its conversational capability for guiding the user in proper message format. As seen from FIGS. 2A, 2B, there are three displays. Each is a rotating drum which changes position as the message is entered and which indicates the current allowable entries.

There are two small upper displays. Display 19 on the left indicates allowable entries via the alphabetic keys. Display 20 on the right indicates the allowable entries via the numeric keys.

The large centralized display 14 defines the operations of function keys 13. There are 10 sections on display 14 which correspond functionally and spatially to the 10 function keys 13. Each key 13 will perform the function indicated by the current adjacent legend on display 14.

Some feeling of the formatting functions performed may be obtained by looking at the display segments. The display segments for the Order Station are shown in Tables I and II and those for a Report Station are shown in Table III.

Operational Features

The common functions are provided by the station in such a way as to minimize the keystrokes required to enter a

TABLE III

| I | II | III | IV | V | VI | VII | VIII | IX | X |
|---|---|---|---|---|---|---|---|---|---|
| OTHER | | | | RL | OL | | | | MISC |
| POSS DUPE | | | BOT | SLD | SLD SHRT | SLD SHRT EXEMPT | | BOT MINUS | SLD PLUS |
| | | | | | | | | | |
| PR | CT | CV | RT | CL | WI | WD | WW | XW | ADV |
| MKT | LIMIT | STP | STP LMT | | MKT CLO | BAS | CLO | WOW | WOW LMT |
| OC | FOK | OPG | | | | | | GTC | DAY |
| | | | | AM | PM | | | | |
| LVS | AON | NH | DNR | | CASH | ND | SELLER | | ADV |
| SW | | | | | | | | | ADV |
| CORR | ACCT NO | NO SHARES | | MISC | | GU | | | |
| NO SHARES EXECUTED | | FIRM SYMBOL | | BROKER | | OTHER SIDE MISC | | OTHER SIDE SPECIAL | |
| $ | & | | | | | | FORM FEED | CR/LF | ADV |

REPORT STATION FUNCTION DISPLAYS message. For example, the keyboard includes fractions down to eighths. Also, the function keys provide a wide range of stock suffixes (qualifiers), e.g., conditional price codes, time in force codes, and so on. All other entries can be made from the alphanumeric part of the keyboard (such as sixteenths and other stock suffixes).

The station also includes a keylock 21 that can be used to provide access to the system only by authorized personnel. When the lock 21 is turned off, the terminal electronics are inhibited so that no entry can be made from the keyboard.

The Controller

The controller 1 for the Terminal System, FIG. 1, provides all of the format control, local copy generation, message buffering and communication control for all the associated stations. It allows all of the stations connected to it to operate simultaneously as long as lines are available. Should a communication line failure occur between TTY line unit 10 and the teletypewriter, all stations will lock up until the lines once again become available. In addition a "No TTY available" message is received by station printer 4. In the control unit 1 a program subroutine is entered which continually looks for an available TTY line and until the control unit leaves this subroutine no data can be entered from the station 2.

Controller Communications

The controller 1 can connect up with a number of networks, e.g., four teletypewriter lines or one voice-grade line. If teletype lines are used, the number of required lines is determined by the traffic entered into the set of stations connected to the controller. Usually, one line will suffice. More can be added if the traffic load so dictates. In the preferred embodiment, all teletypewriter lines must be of the same speed, format and polling discipline, and all must be equivalent in the communication network. For other applications routing and related capabilities may be desirable.

The controller 1 connects into the teletypewriter wire network just as if it were a teleprinter. When it is polled (on any of its lines), it will respond appropriately with a message if one is available, or the appropriate no-message response if one is not available.

The message is properly formatted with SOM (start of message) and EOM (end of message) sequences. Any standard polling and response sequence may be used. Though all teletypewriter lines connected to controller 1 must use the same speed and code, the speed may be any speed from 50 baud to 300 baud, and the code may be either Baudot or ASCII. If a voice-grade line is used, it may be synchronous or asynchronous up to 2400 baud. Controller 1 can be polled on this line also if desired.

All messages transmitted from the controller are assigned a message sequence number, which is automatically included in the message. As previously noted, this sequence number is also printed on the station's printer, so that the user has a complete communication log of his messages. The system includes provisions for adjusting the message sequence number either by user action or by the receipt of a control message from the message switching system.

The control unit 7 of the controller (FIG. 1) is a digital computer which may be hard-wired or, with proper programming, may be of the general purpose type, e.g., type PDP-8/L of the Digital Equipment Corp. The control unit performs the functions of message format validation, local copy generation, display control, message buffering, and communication line control. It accepts information keyed in from each Station 2 and, based on the input data, adjusts the Station displays 3 to continuously indicate to the operator the choice of next allowable entries. It also returns local copy of the input to each Station's printer 4, and checks that the input sequence conforms to the display directions.

If an input error is detected, causing the control unit to activate audible and visual alarm system 9 at a Station, the Control Unit will reset the displays 3 and prepare the system to receive a new message when Station Reset Key 15 is actuated. When a correct message has been received, the control unit 7 prepares it for transmission over the teletypewriter line 6 to which it is connected. It handles all of the polling, code conversion, and timing functions required of the communication line.

Control unit 7 also contains all of the stored programs required to service the order and report terminal and communication line 6. In addition, it contains a stored "processor" program which uses a list of special commands stored in the memory of the control unit. It is this list which describes the details of the allowable formats. This list is designed for a particular application, and loaded into control unit 7. In general and except for communication options this is the only program change required to meet a new application.

Illustrative Operation of the System

In the following description of the system with the station operable as an Order Station, reference should be made to FIG. 3. A description of Report Station operation would be similar.

Figure 3:
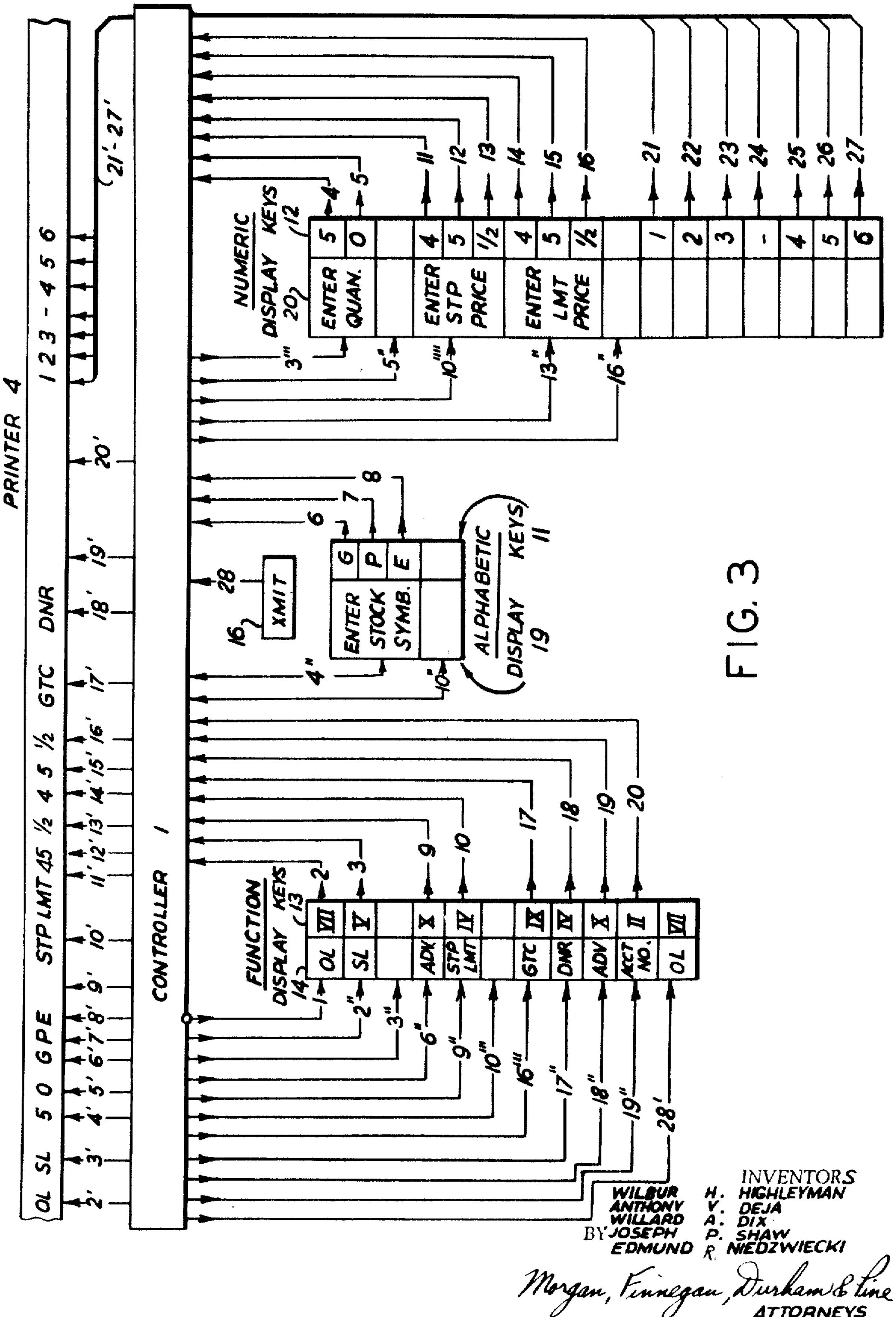
FIG. 3 is a schematic data flow and block diagram indicating the data flow for an illustrative message or transaction as it relates to the displays, the keys, the controller and the printer.

FIG. 3 is a signal flow diagram for a typical transaction. Data is transmitted over wires from the function keys 13, the alphabetic keys 11 and the numeric keys 12, to the controller 1. Controller 1, in response thereto, transmits signals to printer 4, function display 14, alphabetic display 19 and numeric display 20. In addition, transmit key 16 is connected to controller 1 so that an end-of-message signal may be sent to controller 1.

The transaction is an order to sell 50 shares of GPE at 45½ with a stop price of 45½, the order to be good until cancelled (GTC) and the price not reduced (DNR). Reference should also be made to TABLES I and II, above.

1. When the station is idle the alphabetic display 19 and the numeric display 20 are blank while the function display 14 shows the odd lot/round lot (OL/RL) choice to be made by depressing function keys VII or IV respectively.*

*In FIG. 3, the display blocks 14, 19, 20 show in timed sequence starting at the top. the particular legend associated with a particular key at a particular instance of time. The legends and keys not relevant to a particular step of the sequence are not shown. Since the example involves an odd lot (50 shares). the round lot legend and associated function key IV are not shown.

2. Because the quantity is not over 100, the OL key VII is depressed (See data flow line 1). This causes a signal to be sent to the controller 1 (data flow line 2) which in turn directs printer 4 (data line 2') to print "OL" and also directs the function display 14 (data line 2'') to advance one position so that the buy/sell choice may be made (See SL adjacent key V). This sequence and subsequent sequences may be easily followed in FIG. 3 as the data flow and consequences resulting from a given key depression are coded with the same data line number.

3. Since this is an order to sell the operator depresses function key V (for a buy order he would have used function key IV – see Table I). A signal (line 3) is sent to the controller 1. Controller 1 causes printer 4 to print "SL," (line 3'), causes the function display 14 to be blanked (line 3''), and causes the ENTER QUANTITY indication to appear in numeric display 20 (line 3''').

4. The operator then depresses Key "5" on numeric keyboard 12, initiating a signal to controller 1 (line 4). Controller 1 causes "5" to be printed by printer 4 (line 4') and causes the ENTER STOCK SYMBOL indication to appear on alphabetic display 19 (line 4'').

5. Before responding to the direction to enter the stock symbol, the operator completes the entry of the number of shares (50) by depressing the digit "0" key in the numeric keyboard 12, sending a signal to controller 1 (line 5). Controller 1 orders printer 4 to print out "0" (line 5') and orders the numeric display 20 blanked (line 5'').

6. The operator, guided by the ENTER STOCK SYMBOL display, now enters the first letter (G) of the stock symbol in alphabetic keyboard 11. This causes a signal to be sent to the controller 1 (line 6). Controller 1 causes printer 4 to print "G" (line 6') and the function display 14 to go to the next position (line 6''). The significance of this position (ADV) is explained below.

7. The operator, still guided by the ENTER STOCK SYMBOL legend, now enters the second letter (P) of the stock symbol (line 7) and printer 4 prints "P" (line 7').

8. The operator enters the final letter "E" (line 8) which is then printed (line 8').

9. Because stock symbols are of variable length it is necessary to finish the stock symbol portion of the sell order by depressing function key X, which is the "advance" key. This step is commanded by the ADV legend which appears on display 14 during step 6. The depression of key X (line 9) adjacent the ADV legend causes printer 4 to advance the tape (line 9') and controller 1 causes the function display 14 to advance one position (line 9'') to the price choices (qualifications placed on prices) (see Row 6 of Table I).

10. In the illustrated transaction, the operator now selects the price basis of "stop-limit" by depressing function key IV located adjacent the STP LMT legend on display 14, thereby sending a signal to controller 1 (line 10). Controller 1 causes printer 4 to print "STP LMT" (line 10'), causes alphabetic display 19 to be cleared (line 10'') and function display 14 (line 10''') to be similarly cleared; the controller also causes the "ENTER STP PRICE" legend to appear on the numeric display 20 (line 10'''').

11. In response to this instruction, the operator enters the first digit of the stop price by depressing key "4" of the numeric keys 12 (line 11). Printer 4 is order to print "4" by controller 1 (line 11').

12. The operator enters the second digit "5" (line 12) which is recorded by printer 4 (line 12').

13. The operator enters the final digit by depressing the fraction key "one-half" of the numeric keys 12 (line 13). Printer 4 is ordered to print "one-half" (line 13') and the numeric display 20 is advanced one position to "ENTER LMT PRICE" (line 13'').

14. & 15. The operator now enters the first two digits of the limit price (lines 14, 15) and controller 1 orders these to be recorded by printer 4 (lines 14', 15').

16. The final digit of the limit price is entered by the operator (line 16) and printer 4 prints "one-half" (line 16'). Controller 1 clears numeric display 20 (line 16'') and the "time-in-force" indicators of function display 14 appear (line 16''') (see Table I, Row 7).

17. By depressing function key IX just below the legend GTC, the operator selects the "good until cancelled" condition (line 17); controller 1 then orders printer 4 to print "GTC" (line 17') and advances function display 14 (line 17'') to the next row of qualifiers to thereby enable the "do not reduce" qualifier, see Row 9, Table I. (Row 9 of function display 14, which contains additional time-in-force functions, is automatically skipped because of the "good until cancel" choice).

18. The operator selects the "do not reduce" condition (line 18) by depressing function key IV adjacent the DNR symbol of display 14 (Row 9 of Table I). Note that this is the second time that function key IV has been used, i.e., in step 10 it was used to establish the stop limit (STP LMT) condition. Printer 4 now records "DNR" (line 18') and the function display 14 is stepped (line 18'') to the first miscellaneous function display (Row 10 of display 14 and Table I) by depressing function key X for "ADV" (Row 9 of display 14 Table I).

19. Since no miscellaneous functions are required the operator depresses function key X below the advance legend ADV in Row 10 (line 19), thereby advancing printer 4 (line 19') and also advancing the function display 14 (line 19') to the next set of functions (Row 11 of display 14 and Table I) which include the direction to enter the account number. It should be noted that key X also provides multiple functions, serving to initiate an advance during certain stages (See Rows 5, 9 and 10 of display 14 in Table I) and other functions during other stages (See Rows 2, 3, 6, 7, 8 and 12).

20. The operator selects function key II which corresponds to the function display "ACCT NO." The word ACCT NO is not recorded by printer 4.

21—27. The operator enters the customer account number in numeric keyboard 12 (lines 21—27). This causes signals to be sent to controller 1 which orders printer 4 to record the account number (lines 21'—27').

28. At this point the operator checks the message on the printer for accuracy and then depresses transmit key 16 to release the message for transmission (line 28). The controller controls the actual transmission including organization of the order message consistent with teletypewriter format and queing as required. The station returns to its original state and the operator is free to make the odd-lot/round-lot decision for the next transaction (line 28').

Figure 4:
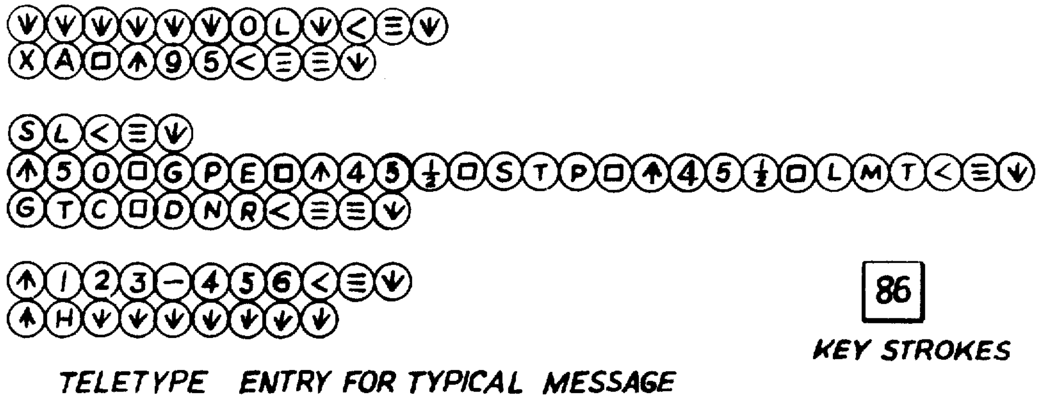
FIG. 4 is a schematic diagram illustrating teletypewriter operations for a typical message.

Note that the entry of this message took 28 key depressions under format guidance and error control. FIG. 4 shows the entry of the same message in a standard teletypewriter format. With a teletypewriter, 86 key depressions are required, with no format guidance and no error control.

Thus, not only does the station allow the properly formatted entry of complex order and report messages by minimally trained personnel, but it also reduces the key strokes required to enter a message by a significant factor.

It should also be emphasized that had the operator departed from the dictated format, the alarm system 9 would be actuated and transmission blocked. Of course errors in price, number of shares, etc. are not detectable if they occur within system format constraints.

DETAILED DESCRIPTION

Station

Described below are further characteristics of the electromechanical station. See FIGS. 2A, 2B.

Keyboard

The keyboard 5 utilizes self-encoding switches or equivalent. It provides signals representing data, a strobe, and a multiple-key-depression indication ("monitor").

The electrical interface between keyboard 5 and the section line unit 8 is as follows: (See FIG. 2B)

Common—The lead to which all other signals are referenced.

Data—Six wires on which input data is generated as closures to ground upon the depression of a key. All keys except for ADV 18 generate a 6-bit code. This code is set forth in detail hereinafter.

Reset—When the RESET key 15 is depressed, it energizes this lead as well as the appropriate data leads. This is used to clear the alarm 17.

Strobe—A closure to ground caused by key depression and indicating that a data character appears on the data leads.

Monitor—A lead used to detect simultaneous key depressions.

Paper Advance—A closure to ground when ADV key 18 is depressed. It advances the paper in the strip printer 4.

Alarm—An incoming signal indicating an error. When pulsed, the ALM key 17 will illuminate and the audible alarm will sound. This lead is closed in the Line Unit by the RESET key 15.

Printer

The station printer 4 is an electrolytic strip printer employing a set of vertically aligned electrodes. Except for dimensional changes, it may be equivalent to the Data Trends, Inc. type TP-10 printer.

The electrical interface of the printer is as follows:

Common—The lead to which all signals are referenced.

Column Data—Seven leads which are pulsed appropriately to print the successive columns of the character matrix (five columns to a character).

Motor Drive—Leads which are energized to drive the printer one column at a time.

The printer 4 is capable of operating asynchronously (one column at a time), due to potential processing delays in the control unit 7. It is capable of printing at any rate up to 10 characters (60 columns) per second.

Displays

The display section 3 of the station consists of the upper left "Alphabetic" display 19, the upper right "Numeric" display 20, and the lower central "Function" display 14.

Each display comprises a labeled cylinder 14*a*, 19*a* and 20*a*, respectively, and an electrically operated drive, e.g., a stepping motor 14*b*, 19*b* and 20*b*, respectively, which can rotate the cylinder to any one of 12 predetermined and equally spaced positions. Each display is designed so that it will reliably rotate any number of steps at a rate of at least 10 steps per second. Tables I, II and III show the displays in plan projection.

Approximately one-twelfth of each cylinder is viewable through an opening in the front of the terminal case. Thus, as each cylinder is rotated, one of the 12 rows of the preprinted labels, or displays may be seen. Each visible function display segment of the discernable row is located over the associated function key 14 (labeled I through X on the keyboard).

The electrical interface of the display system comprises three leads per separate display as follows:

Common—The lead to which all other signals are referenced.

Step—Energizing this lead will cause the respective display cylinder to rotate one position.

Home—One position of each cylinder is designated as the "-home" position. When in this position, the Home lead will be closed to the Common lead.

Keylock

Keylock 21, provided on the front of the case, is to prevent unauthorized use of the station. This will interrupt the Strobe lead of the Keyboard 5 so that no data can be entered when the Keylock 21 is turned off.

Control Unit Description

Control unit 7 performs the functions of validity checking, message buffering, control of printer 4, display 3, and communication line 6. The control unit, which has moderately fast access time, e.g., 1.5 $\mu$sec., and operates on a 12-bit word basis, connects with the external equipment via input-output bus 33.

Figure 5:
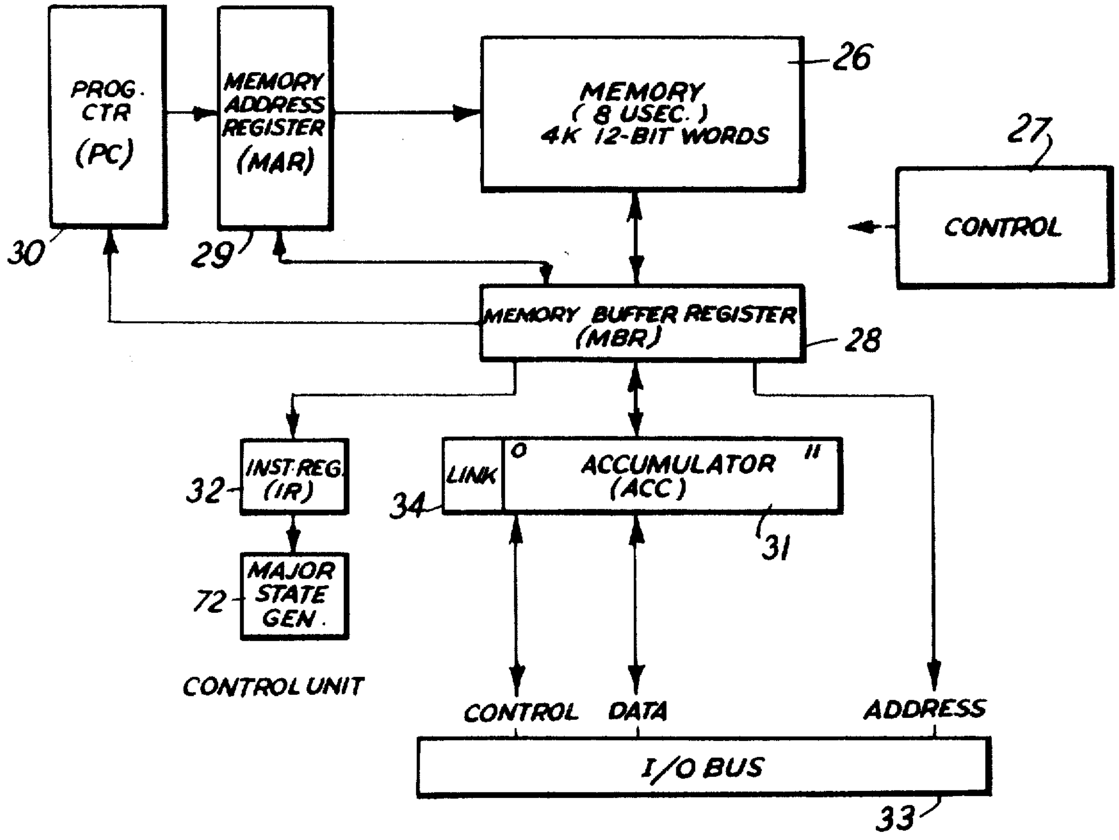
FIG. 5 is a schematic block diagram showing certain components of the control unit.

A block diagram of control unit 7 is shown in FIG. 5. Its principal components include, in addition to control logic, a core memory 26 and several registers including an Accumulator (ACC) 31, Memory Buffer Register (MBR) 28, Memory Address Register (MAR) 29, a Program Counter (PC) 30, Instruction Register (IR) 32 and Major State Generator 72.

All arithmetic, logic and system control operations are performed by the control unit. Permanent (longer than one instruction time) local information storage and retrieval operations are performed by core memory 26. The memory continuously cycles automatically performing a read and write operation during each computer cycle.

Input and output address and data buffering for the core memory is performed by the registers of the control unit, and operation of the memory is under control of timing signals produced by a timing system described hereinafter.

Since the interconnection of the registers and memory depend on the program step, only one exemplary data flow condition is shown in FIG. 5. As shown hereinafter the registers may exchange their contents, increment them, and so on.

Accumulator (ACC)

The accumulator is a 12-bit register with which all arithmetic and logic operations are performed. All data transfers with the stations and other external equipment are processed in the accumulator 31 which is coupled to the input/output bus 33. Under program control, ACC 31 can be cleared or complemented and its content can be rotated right or left with link 34, a one-bit register. The content of memory buffer register 28 can be added to the content of ACC 31 and the result left in ACC 31. Also, the content of both of these registers may be combined by the logical operation AND, the result remaining in ACC 31.

Accumulator 31 also serves as the input-output register. All programmed information transfers, e.g., key, display and printer data, between core memory 26 and the external components pass through accumulator 31.

Link (L)

This one-bit register is used to extend the arithmetic facilities of accumulator 31. It is used as the carry register for two's complement arithmetic. Overflow into L 34 from ACC 31 is also checked by the program. Under program control link 34 may be cleared and complemented, and it can be rotated as part of accumulator 31.

Program Counter (PC)

The program sequence, that is the order in which instructions are performed, is determined by PC 30. This 12-bit register contains the address of the core memory location from which the next instruction is taken. Information enters PC 30 from core memory 26, via the memory buffer register 28. Information in PC 30 is transferred into memory address register 29 to determine the core memory address from which each instruction is taken. Incrementation of the content of PC 30 establishes the successive core memory locations of the program and also provides skipping of an instruction where applicable.

Memory Address Register (MAR)

The address in core memory 26 which is currently selected for reading or writing is contained in this 12-bit register. Therefore, all 4096 words of core memory can be addressed directly by this register. Data can be set into it from memory buffer register 28 and from program counter 30.

Core Memory

Core memory 26 provides storage for the program instructions to be performed and the information to be processed or distributed. It comprises a random address magnetic core which illustratively holds 4096 12-bit words. A memory location ($0_8$) is used to store the content of Program Counter PC 30 following a program interrupt, and another location ($1_8$) is used to store the first instruction to be executed following a program interrupt. When a program interrupt occurs, the content of PC 30 is stored in location $0_8$, and program control is transferred to location 1 automatically. Further locations ($10_8$ through $17_8$) are used for auto-indexing while the other locations are used to store system instructions and data including the keyboard, display, printer and message data.

Core memory 26 also contains conventional circuits (not shown) such as read-write switches, address decoders, inhibit drivers, and sense amplifiers. These circuits perform the electrical conversions necessary to transfer information into or out of the core array.

Memory Buffer Register (MBR)

All information transfers (excluding addressing) between the control unit registers and core memory 26 are temporarily held in MBR 28. Information is transferrable into MBR 28 from accumulator 31 or memory address register 29. MBR 28 can be cleared, incremented by one or two, or shifted right. In the illustrative embodiment, information is read from a memory location in 0.75 microsecond and rewritten in the same location in another 0.75 microsecond of one 1.5 microsecond memory cycle.

Instruction Register (IR)

This 3-bit register 32 contains the operation code of the instruction currently being performed by the machine. The three most significant bits of the current instruction are loaded into IR 32 from memory buffer register 28 during a Fetch cycle. The content of IR 32 is decoded to produce the currently operable instruction of the eight basic instructions, and to thereby control the cycles and states entered at each step in the program as described more fully hereinafter.

Major State Generator

One or more major computing states of the system are entered serially to execute programmed instructions. Major state generator 72 establishes one state for each computer timing cycle. "Fetch," "Defer," and "Execute" states, defined hereinafter, are entered to determine and execute instructions. Entry into these states is produced as a function of the current instruction derived from IR 32 and the current state.

Fetch

During this state an instruction is read into MBR 28 from core memory 26 at the address specified by the content of PC 30. The instruction is restored in core memory 26 and retained in the MBR 28. The operation code of the instruction is transferred into IR 32 as noted above to cause enactment, and the content of PC 30 is incremented by one.

If a multiple-cycle instruction is fetched, the succeeding major state will be either Defer or Execute. If a 1-cycle instruction is fetched, the operations specified are performed during the last part of the Fetch cycle and the next state will be another Fetch.

Defer

When a 1 is present in bit 3 of a memory reference instruction read out of the memory, the Defer state is entered to obtain the full 12-bit address of the operand from the address in the current memory page or page 0 as specified by bits 4 through 11 of the instruction. The process of address deferring is indirect addressing because access to the operand is addressed indirectly, or deferred, to another memory location.

Execute

This state is entered for all memory reference instructions except jump. During an AND, "two's complement add," or "increment and skip if zero" instruction, the content of the core memory location specified by the address portion of the instruction is read into MBR 28 and the operation specified by bits 0 through 2 of the instruction is performed. During a "-deposit and clear accumulator" instruction, the content of ACC 31 is transferred into MBR 28 and is stored in core memory 26 at the address specified in the instruction. During a "jump to subroutine" instruction, this state occurs to write the content of PC 30 into the core memory address designated by the instruction and to transfer this address into PC 30 to change program control.

The Fetch, Execute and Defer states can be better understood by the following example of system operation. (See FIG. 5)

When, for example, an alphabetic key in the keyboard 5 is depressed it generates a 6-bit message which is stored in ACC 31. In order for the control unit to know that key has been depressed a validity check is run whereby the character stored in ACC 31 is compared with known characters stored in the memory 26.

The Fetch state permits the extraction from address Y in memory 26 of the content of that address which is then stored in MBR 28.

During the Execute state a bit-by-bit exclusive OR operation is performed between the content of MBR 28 and the content of ACC 31. If, after this comparison, the content of ACC 31 is zero, then the validity and identity of the key depressed has been verified.

The Defer state can be explained by use of the program instruction "JMP I Y." During a Defer state the *content* of address Y (which will be called address X) in memory 26 is read from the memory into MBR 28 and then into MAR 29. MAR 29 then goes to address X as specified by the *content* of address Y. Therefore, MAR 29 does not go to address X directly, but rather is *deferred* to address X by *first* looking to address Y.

Figure 11:
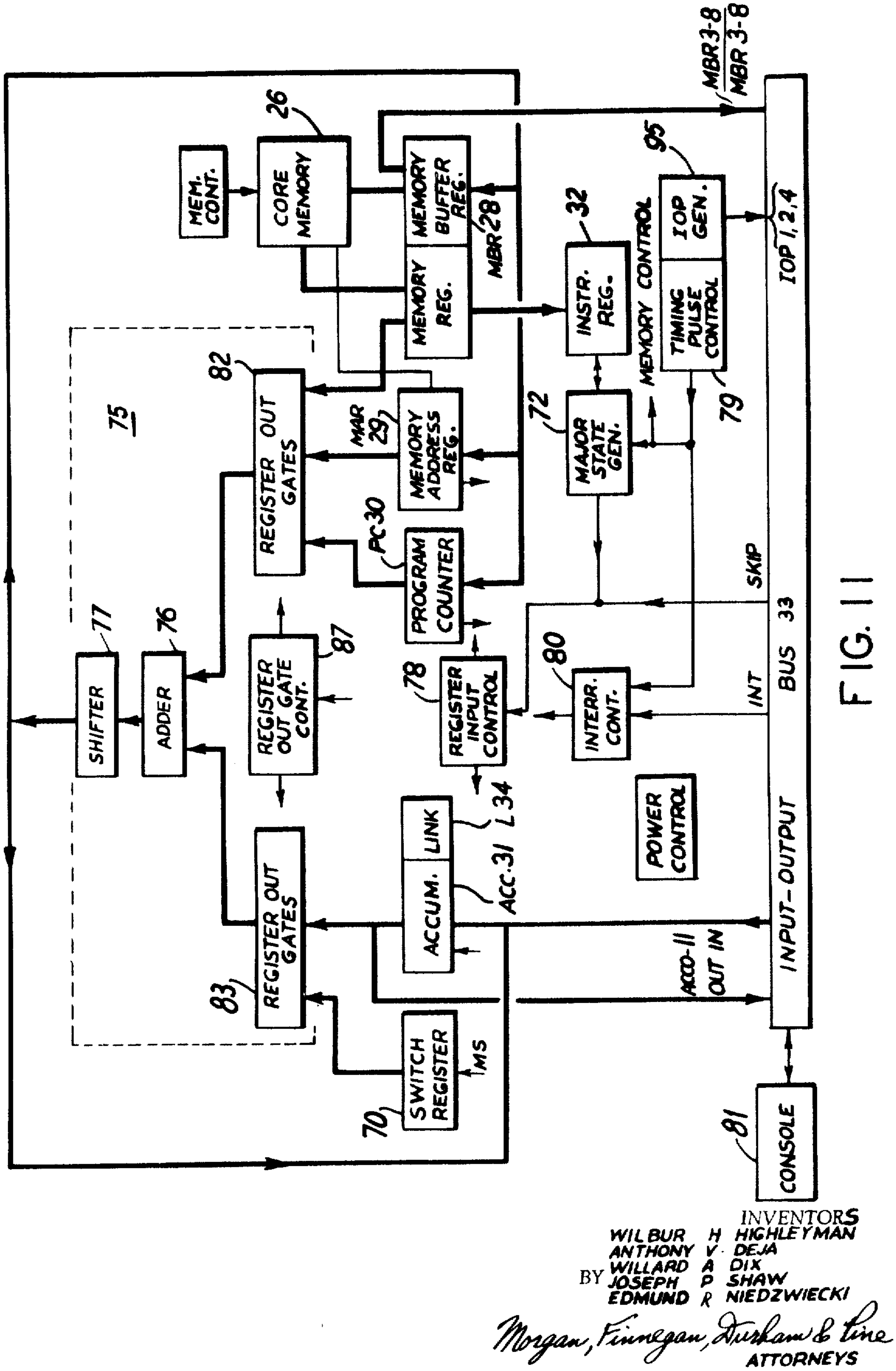
FIG. 11 is a schematic block diagram showing additional component organization within the control unit.

For the following additional description of the control unit reference should be made to FIG. 11 wherein the major functional elements of the control unit are set forth. The output of the major register gating group 75, comprising register output gates 82 and 83, adder 76 and shifter 77, can be directed to MBR 28, MAR 29, PC 30 and ACC 31. Since major register gating 75 can receive inputs from switch register 70, ACC 31, PC 30, MAR 29 and memory register 84 data transfer between these registers is possible. Major register gating 75 is controlled by register input control 78 and register output gate control 87. Memory control 27 feeds memory 26 which in turn is connected to memory register 79 and MBR 28.

The I/O Bus 33 connects to the input and output of ACC 31, interrupt control 80, IOP generator 95 and console 81. The timing pulse control 79 feeds major state generator 72, memory control 27 and interrupt control 80. The instruction register 32 receives data from memory register 84 and feeds major state generator 72 which in turn feeds register input control 78.

Register Controls

ACC 31, MAR 29, MBR 28 and PC 30 each have gated inputs and gated outputs. The gated input bus of each register is tied to a common register bus that is the output of the major register gating circuit 75. The data on the common register bus originates from the various outputs of each register and can be modified by the ADDER 76 or SHIFTER 77 in major register gating circuit 75. When the contents of a register are to be transferred to another register, its contents are gated by the register output gate control onto the common register bus and strobed into the appropriate register by the register input control 78. Data can therefore be transferred between registers directly by disabling ADDER 76 and SHIFTER 77 or can be modified during transfer to provide SHIFT, CARRY and SKIP operations. Operations such as incrementing a register are accomplished simply by gating the output of the register onto the register bus, enabling ADDER 76, and strobing the results back into the same register.

An example of how register gating is utilized in the illustrative embodiment is as follows. If an alphabetic key is depressed on keyboard 5 the data is initially entered in ACC 31 via I/O Bus 33. The contents of ACC 31 are then taken by major register gating 75 and gated onto the common register bus and then strobed into MBR 28. From there the data is transferred to the keyboard buffer register 61 (shown in FIG. 12) which is part of memory 26.

Switch Register

To facilitate diagnostic procedures and the like, the control unit preferably includes manual switching MS and a switch register 70 permitting storage of address and data, core memory data examination, the normal start/stop/continue control, and the single step or single instruction operation that allows a program to be monitored visually as a maintenance operation. Most of these manually initiated operations are performed by executing an instruction in the same manner as by automatic programming, except that the gating is performed by special pulses rather than by the normal clock pulses.

In automatic operation, instructions stored in core memory 26 are loaded into the memory buffer register 28 and executed during one or more computer cycles. Each instruction determines the major control states that must be entered for its execution. In the illustrative embodiment, each control state lasts for one 1.5-microsecond computer cycle and is divided into distinct time states which can be used to perform sequential logical operations. Performance of any function of the control unit is controlled by gating of a specific instruction during a specific major control state and a specific time state.

Timing and Control Elements

The circuit elements that determine the timing and control of the operation of the major registers of the control unit include timing generators, register controls and program controls.

Timing Generators

Timing pulses used to determine the system cycle time and used to initiate sequential time-synchronized gating operations are produced by the timing signal generator 79. In addition, special pulse generators, not shown, supply timing pulses used during operations resulting from the use of the manual switching MS and pulses that reset registers and control circuits during power turn on and turn off operations.

Program Controls

The circuits that produce the IOP pulses which initiate operations involved in input-output transfers and which determine the advance of the computer program, are described hereinafter in connection with the line units 8.

Further details of the organization and operation of the control unit will be described in the following explanation of system controls and instruction characteristics.

Instruction Repertoire

There are eight basic instructions in the control unit. Six (AND, TAD, DCA, JMP, JMS, ISZ) are memory reference instructions. One instruction (Operate) allows various operations on the accumulator 31. One instruction (IOT) allows communication with the station 2 and other external equipment connected to the I/O bus 33.

Memory Reference Instructions

Figure 6A:
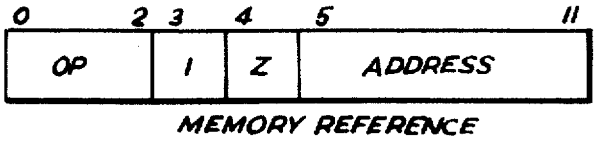
FIGS. 6A, 6B and 6C are a schematic diagram illustrating instruction formats.

The format of a memory reference instruction is shown in FIG. 6A. Before describing the instructions, addressing will be discussed.

A memory reference instruction contains a 7-bit address (bits 5—11). This will specify one of 128 words. A group of 128 words is called a "page." Thus, the 4096 word memory 26 contains 32 pages.

In general, to reference any word in core requires a 12-bit address (4096 possibilities). The indirect bit (I-bit 3) provides this addressing capability. If I is "zero," the 7-bit address (bits 5—11) is taken as being the address of the indicated word in the same page as the instruction. If I is "one," the 7-bit address points to an effective 12-bit address in the same page. This 12-bit effective address can reference any word in core.

The very first page (page zero) is directly addressable by an instruction in any other page by use of the Z bit (bit 4). If Z is "zero," the direct reference is to that location in page zero; if Z is "one," the direct reference is to that location in the same page as the instruction.

In summary, the I and Z bits affect addressing as follows:

| Bit 3 (I) | Bit 4 (Z) | Effective Address |
|---|---|---|
| 0 | 0 | The operand is in page 0 at the address specified by bits 5—11. |
| 0 | 1 | The operand is in the current page at the address specified by bits 5—11. |
| 1 | 0 | The absolute address of the operand is taken from the 12-bit content of the location in page 0 designated by bits 5—11. |
| 1 | 1 | The absolute address of the operand is from the 12-bit content of the location in the current page designated by bits 5—11. |

The 3-bit operation code (OP) specifies an operation using the contents of the location specified by bits 3—11 of the instruction (I, Z, ADDRESS). The memory reference instructions are (Y represents the effective address):

| OP Code (Octal) | Nmenonic | Function |
|---|---|---|
| 0 | AND Y | The *AND* operation is performed between the content of the memory 26 location Y and the content of ACC 31. The result is left in ACC 31, the original content of ACC 31, is lost, and the content of Y is unchanged. Corresponding bits of ACC 31 and Y are operated upon independently. This instruction, often called extract or mask, can be considered a bit-by-bit multiplication. |
| 1 | TAD Y | The content of memory 26 location Y is added to the content of ACC 31 in *two's* complement arithmetic. The result of this addition is held in ACC 31, the original content of ACC 31 is lost, and the content of Y is unchanged. If there is a carry from the high order bit of ACC 31, the link 34 is complemented (the line 34 and ACC 31 form a 13-bit adder, with the link 34 being the high order bit. |
| 3 | DCA Y | The content of *ACC 31 is deposited* in memory 26 at address Y, and ACC 31 is cleared. The previous content of memory 26 location y is lost. |
| 5 | JMP Y | Address Y is set into PC 30 so that the next instruction is taken from core memory 26 address Y. The original content of PC 30 is lost. The content of ACC 31 is unchanged. |
| 2 | ISZ Y | The content of memory location Y is incremented by one in two's complement arithmetic. *If* the resultant content of Y equals *zero*, the content of PC 30 is incremented by one the next instruction is *skipped*. If the resultant content of Y does not equal zero, the program proceeds to the next instruction. The incremented content of Y is restored to memory. The content of ACC 31 is not affected by this instruction. |
| 4 | JMS Y | The content of the PC is deposited in core memory location Y and the next instruction is taken from core memory location Y+1. The content of ACC 31 is not affected by this instruction. |

Operate Instructions

Figure 6B:
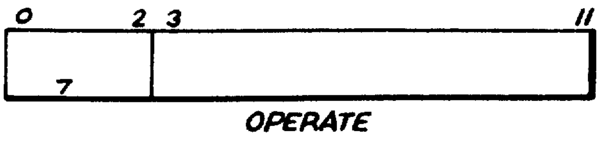

The operate instructions, initiated by the "operate" memory reference instructions, operate solely upon the contents of accumulator 31. The format of the operate instruction is shown in FIG. 6B. The operation code field (OP) is always 7. Note that ACCO is the high order bit and ACC 11 is the low order bit. Various bits in the rest of the instruction field cause certain operations on accumulator 31, as specified below.

| Instruction Octal | Nmenonic | Function |
|---|---|---|
| 7010 | RAR | *Rotate ACC 31 Right*. The content of ACC 31 is rotated one binary position to the right with the content of link 34. The content of bits ACC 0—10 are shifted to the next less significant bit, the content of ACC 11 is shifted into link 34, and the content of link 34 is shifted into ACCO. The RAR instruction is utilized where a 12-bit memory buffer contains data in the left six bits and the right six bits contain information left over from a calculation. All 12 bits are read into ACC 31 and RAR is utilized six times to shift the right six bits out of ACC 31 before sending the contents of ACC 31 to an output device. |
| 7440 | SZA | *Skip* on *zero ACC* 31. The content of each bit of ACC 31 is sampled, and if all bits are "zero," the content of the PC 30 is incremented by one so that the next sequential instruction is skipped. If any bits contain a "one" no operation occurs and the next sequential instruction is executed. The SZA instruction is utilized after a successful character validity check as described previously. If the character is valid the content of ACC 31 will be zero and the next sequential instruction is skipped. |
| 7000 | NOP | This command causes a 1-cycle delay in the program and then the next sequential instruction is initiated. This command is used to add execution time to a program such as to synchronize subroutine or loop timing with peripheral equipment |

| | | |
|---|---|---|
| | | timing. The NOP command is used to let data settle in ACC 31 after it has been transferred from e.g. input register 39 of station line unit 8 (see FIG. 7) |
| 7001 | IAC | The content of the *ACC* is incremented by one in two's complement arithmetic. The IAC instruction is utilized when a sequence of consecutive numbers is to be read from ACC 31 and it is desired to conserve memory buffer space. The first number is read from the memory buffer into ACC 31 and the successive numbers are generated by incrementing ACC 31. |
| 7004 | RAL | The content of the *ACC* is *rotated* one binary position to the *left* with the content of the link. The content of bits ACC 1—11 are shifted to the next greater significant bits, the content of ACCO is shifted into the link, and the content of the link is shifted into ACC 11. The RAL command is used when it is desired to store two 6-bit keyboard characters in ACC 31 before operating on them. The first character is read into ACC 31 from input register 39 in station line unit 8 and the RAL instruction is executed six times, shifting the first six bits six places to the left. The second 6-bit keyboard character is now read into ACC 6—11. |
| 7006 | RTL | The content of the ACC is *rotated two* binary positions to the *left* with the content of the link. This instruction is logically equal to two successive RAL operations. The RTL command is used in the same manner as the RAL command except that it need be performed only three times to achieve the same result as the RAL command done six times. |
| 7012 | RTR | The content of the ACC is *rotated two* binary positions to the *right* with the content of the link. This instruction is logically equal to two successive RAR operations. The RTR command is used in the same manner as the RAR command except that it need be performed only three times to achieve the same result as the RAR command done six times. |
| 7020 | CML | The content of the *link* is *complemented*. The CML instruction functions as a program pointer. |
| 7040 | CMA | The content of the *ACC* is set to the one's *complement* of the current content of the ACC. The content of each bit of the ACC is complemented individually. The CMA command is used in a character validity check sequence where the character stored in address Y is in complement form. A bit-by-bit exclusive OR may now be performed between the content of address Y and ACC 31. If the result is that ACC 31 is zero the character is valid. |
| 7041 | CIA | The content of the ACC is converted from a binary value to its equivalent two's complement number. This conversion is accomplished by combining the CMA and IAC commands, thus the content of the *ACC* is *complemented* during sequence 2 and is *incremented* by one during sequence 3. The CIA command is used when it is desired to read out a sequence of consecutive numbers from ACC 31 and to conserve memory buffer space and where the first number is stored in address Y in complement form. Address Y is read into ACC 31, the content of ACC 31 is complemented and then ACC 31 is incremented after each number is read out. |
| 7100 | CLL | The content of the *link* is *cleared* to contain a 0. The CLL instruction is used when after a TAD instruction is executed and the content of link 34 is no longer needed, it is cleared |
| 7120 | STL | The *link* is *set* to contain a binary 1. This instruction is logically equal to combining the CLL and CML commands. The STL instruction is a program pointer. |
| 7200 | CLA | The content of each bit of the *ACC* is *cleared* to contain a binary 0. The CLA instruction is utilized when after an unsuccessful character validity check, the content of ACC 31 is found to be nonzero. It is therefore necessary to compare the next character from memory 26 with the content of keyboard buffer 61 and before this can be done ACC 31 must be cleared. |
| 7240 | STA | Each bit of the *ACC* is *set* to contain a binary 1. This operation is logically equal to combining the CLA and CMA commands. The STA command is used when it is desired to have the keyboard character entered in ACC 31 to be in complement form. ACC 31 is set to "ones" and when the keyboard character is entered in ACC 31 it appears in complement form. |
| 7402 | HLT | Clears a flip-flop (not shown) at Sequence 3, so that the program stops at the conclusion of the current machine cycle. This command can be combined with others in the OPR group that are executed during either sequence 1, or 2, and so are performed before the program stops. The HLT command is only used when the program encounters an unusual error routine. |
| 7404 | OSR | The inclusive OR operation is performed between the content of the ACC and the content of the switch register 70. The result is left in the ACC, the original content of the ACC is lost, and the content of the SR is unaffected by this command. When combined with the CLA command, the OSR performs a transfer of the SR into the ACC. The OSR command is used chiefly for guidance. The switch register 70 is used to switch between a local or a commercial teletypewriter. |
| 7410 | SKP | The content of the PC is incremented by one so that the next sequential instruction is *skipped*. |
| 7420 | SNL | The content of the *Link* is sampled, and if it contains a 1 the content of the PC is incremented by one so that the next sequential instruction is skipped. If the Link contains a 0, no operation occurs and the next sequential instruction is initiated. The SNL instruction is a program pointer |
| 7430 | SZL | The content of the *Link* is sampled, and if it contains a 0 the content of the PC is incremented by one so that the next sequential instruction is skipped. If the Link contains a 1, no operation occurs and the next sequential instruction is initiated. The SZL instruction is a program pointer. |
| 7450 | SNA | The content of each bit of the *ACC* is sampled, and if any bit contains a 1 the content of the PC is incremented by one so that the next sequential instruction is skipped. If all bits of the ACC contain a 0, no operation occurs and the next sequential instruction is initiated. |
| 7500 | SMA | The content of the *most* significant bit of the *ACC* is *sampled*, and if it contains a 1, indicating the ACC contains a negative two's complement number, the content of the PC is incremented by one so that the next sequential instruction |

| | | |
|---|---|---|
| | | is skipped. If the ACC contains a positive number no operation occurs and program control advances to the next sequential instruction. The SMA command is used where ACC 31 contains the complement of a number. |
| 7510 | SPA | The content of the most significant bit of the ACC is sampled, and if it contains a 0, indicating a positive (or zero) two's complement number, the content of the PC is incremented by one so that the next sequential instruction is skipped. If the ACC contains a negative number, no operation occurs and program control advances to the next sequential instruction. The SPA instruction is used to avoid lengthy comparisons. |
| 7600 | CLA | Each bit of the *ACC* is *cleared* to contain a binary 0. The CLA command is used to clear ACC 31 after an unsuccessful character validity check. |

Input/Output Transfer (IOT) Instructions

Figure 6C:
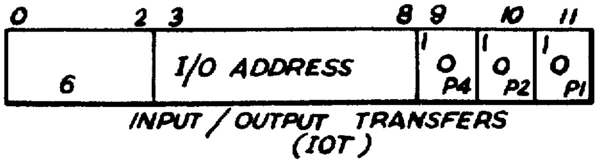

The format of the IOT instructions enabled by the IOT memory reference instructions is shown in FIG. 6C. The OP code (bits 0—2) is always 6. Bits 3—8 give the 6-bit address involving the stations and other external equipment, which is fed to the I/O bus 33. Bits 9, 10 and 11 give subcommands to the external equipment. It should be noted that these subcommand IOP pulses are not staggered in time. They all occur simultaneously.

The device address and subcommands are transmitted to all external devices via Bus 33, and the line units described more fully hereinafter.

Input/Output Bus

Control unit 7 communicates with the line units, external stations 2, and teletype lines 6, via the I/O Bus 33 (FIG. 5, 11) which operates on negative logic in contrast with the positive logic used in the control unit. All data transfers between the control unit and the I/O Bus are via the accumulator 31. Device addresses and subcommands are generated by the IOT codes and sent over the Bus which may also interface the control unit with a program loading and maintenance console which typically includes a teletypewriter unit. The "bus" system, which includes all required drivers and receivers, allows a single set of data and control lines to communicate with the I/O devices. The Bus 33 simply goes from one external station to the next, no additional connections to the control unit being required. Accordingly, the control unit need not be modified when new stations are added.

In addition to the above functions, I/O Bus 33 provides the additional function:

Skip—The addressed external station 2 under certain conditions described hereinafter in connection with FIG. 7, routes a subcommand IOP pulse to the Skip line in I/O Bus 33 (see FIG. 11). This will cause the PC 30 to be incremented, so that the next sequential instruction is skipped.

As shown in FIG. 11, IO Bus 33 transfers the following signals:

| Designation | No. of Signal Leads | Function |
|---|---|---|
| A. Input | | |
| ACC 0—11 | 12 | Input leads to ACC 31. Force the corresponding ACC bit to a "one" state if signal is true and do not change ACC bit if signal is false. |
| SKIP | 1 | May be energized only during an IOP time. Causes PC 30 to be incremented, so as to skip the next instruction. |
| INT | 1 | Interrupt line—signals the program that immediate attention is required of the I/O bus. |
| B. Output | | |
| ACC 0—11 | 12 | Output signals from ACC 31 |
| MBR 3—8 | 6 | Output signals from bits 3—8 of MBR 28. Addresses external components during IOT code. When generated by other functions there is no effect on the external unit because there are no IOP commands. |
| $\overline{MBR\ 3-8}$ | 6 | The complement of bits 3—8 of the MBR 28, device address is sent out as complimentary lines to simplify addressing in the external device. |
| IOP 4, IOP 2, IOP 1 | 3 | Energized for at least 1 μsec. during an IOT command if bits 9, 10 or 11 respectively is set in the IOT command. |

The IOP pulses are not timed; that is, they all occur simultaneously. Therefore, they cannot be mixed to provide sequential commands with a single IOT code. In general, each IOT command generates only one IOP pulse.

Power Control

The power control system, FIG. 11, provides the function of maintaining the contents of memory 26 during power-off conditions.

When power is turned on, the following sequence will occur:

The system waits until DC power has stabilized. The instruction in location 0 is then executed (this will normally be a JMP instruction to the beginning of the program).

Console

A connection is provided to allow connection of an external console 81 to I/O Bus 33 of control unit 7. This console typically includes an 8-level paper tape reader (or equivalent) and its control unit for loading programs with control unit 7. The paper tape reader (or equivalent) preferably operates under the following IOT commands:

6031 Skip the next instruction if the next character is ready.

6032 Clear the reader flag (a flip-flop). Transfer the character to ACC 4—11 (ASCII parity bit in ACC Y). Clear the reader buffer and get the next character.

In addition to the reader, other devices may be included in the console to facilitate system debugging and maintenance. Such devices might include a printer, keyboard, and punch.

Station Line Unit

Station line unit 8 adapts the electrical interface of station 2 to control unit 7 (FIG. 1). It also provides a testable interrupt flip-flop 37 (FIG. 7) for control unit 7 so that it may accomplish timed functions (this source is not duplicated in expansion line units, as one clock will service all line units).

Figure 7:
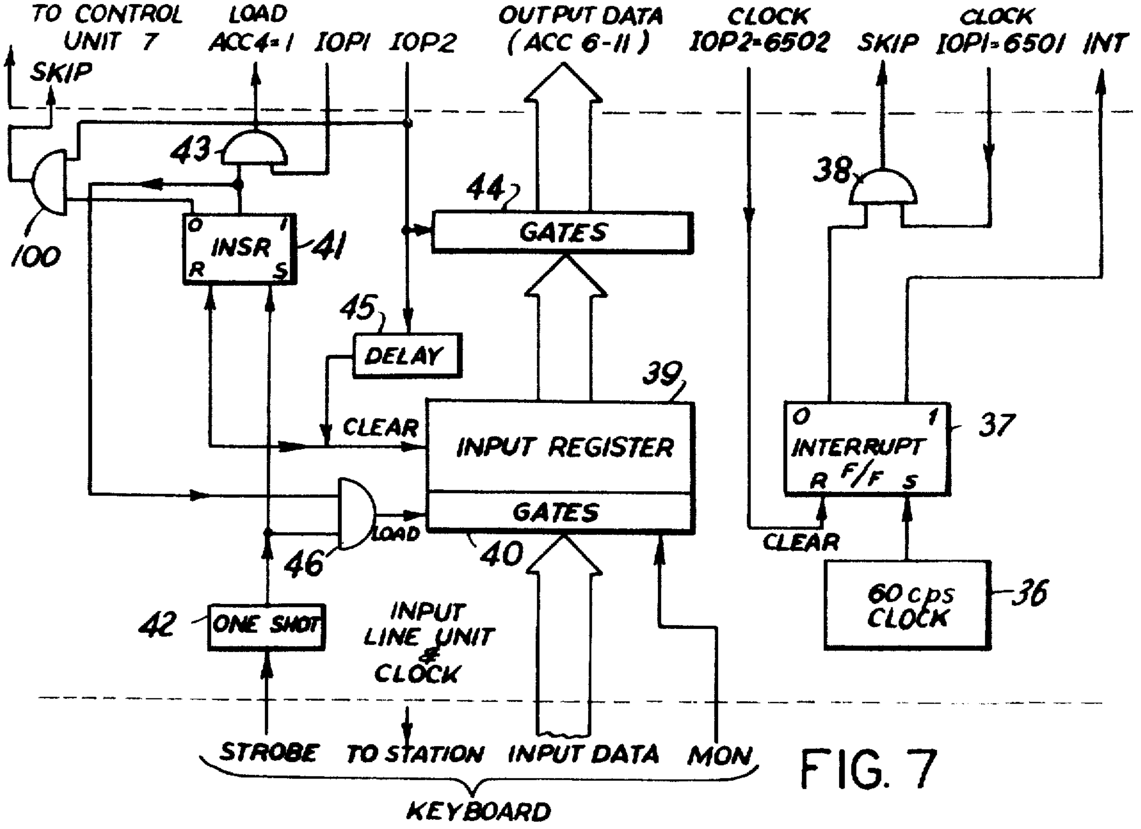
FIG. 7 is a schematic and block diagram of the input section of a station line unit and the clock system.
Figure 8:
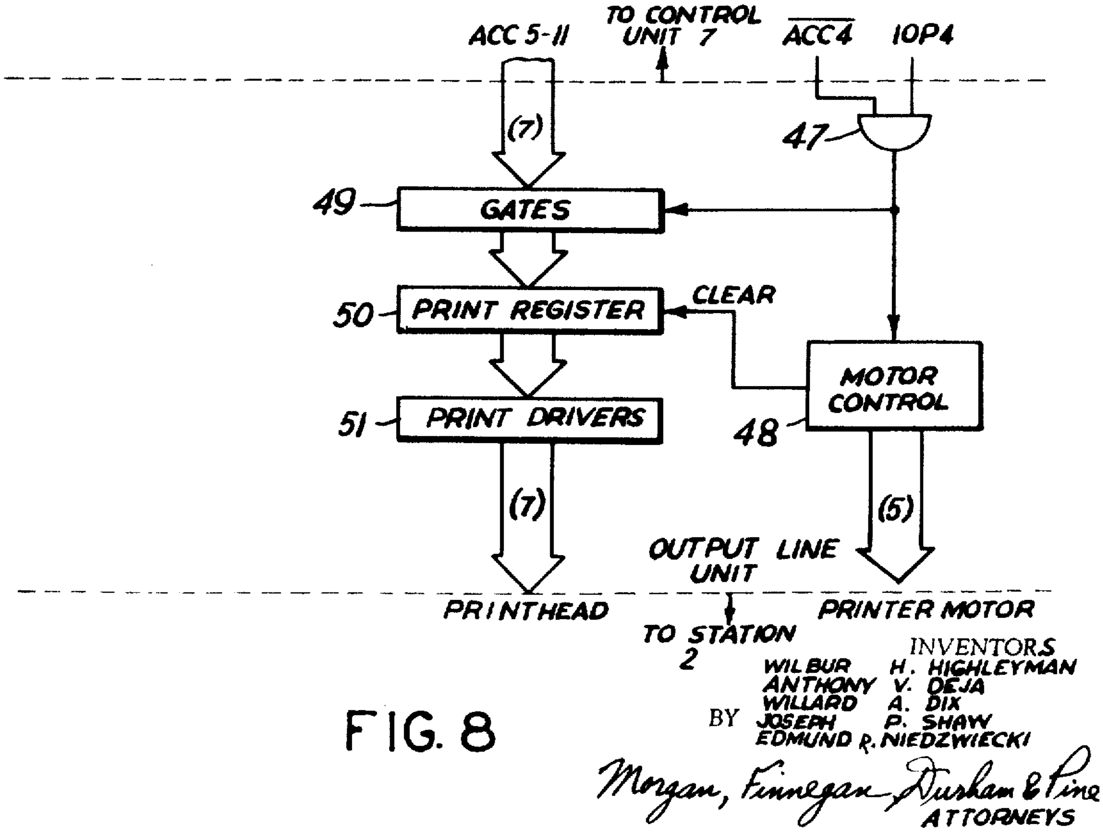
FIG. 8 is a schematic diagram of certain components of the output section of a station line unit.
Figures 9, 10:
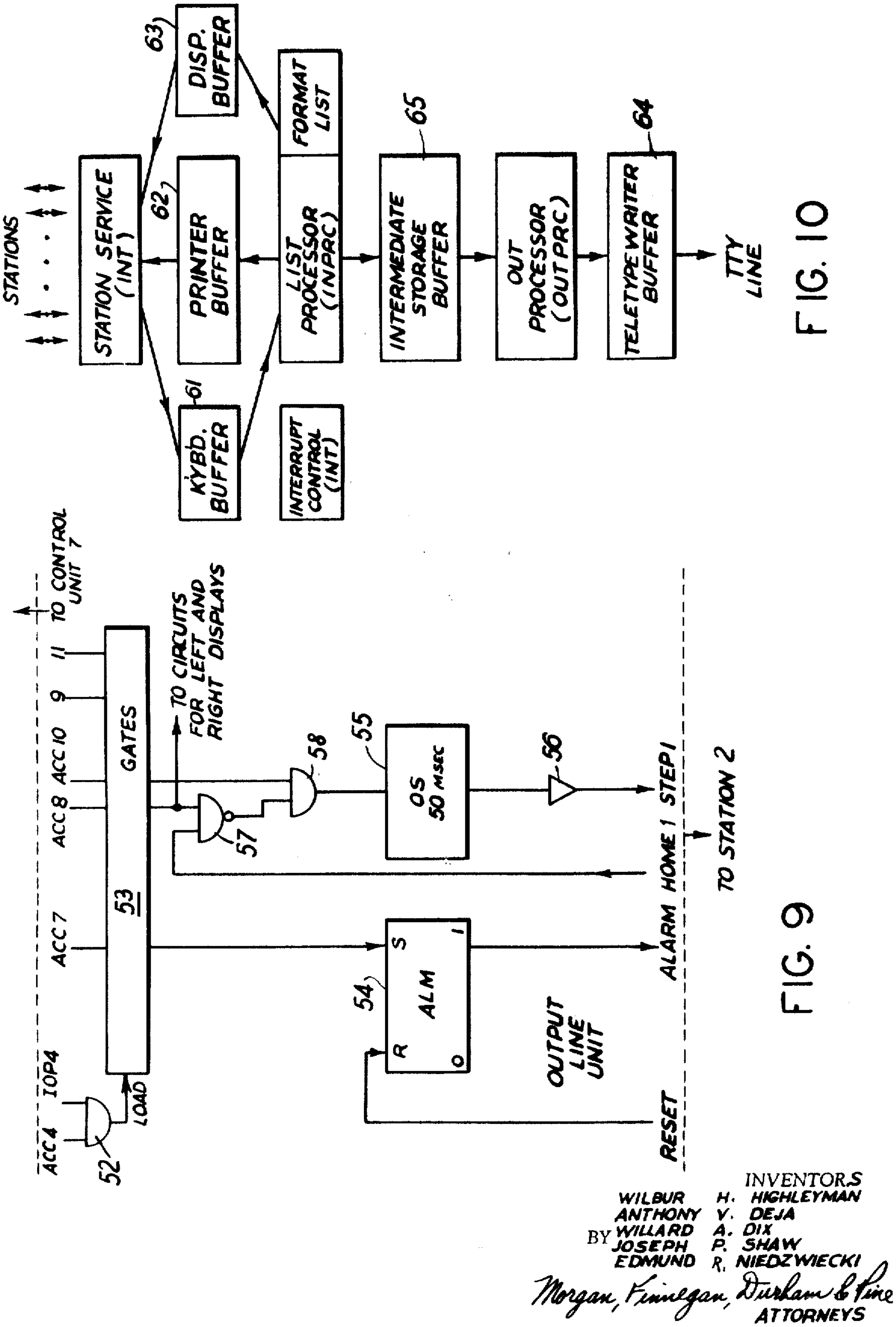
FIG. 9 is a schematic block diagram showing additional components of the output section of a station line unit.
FIG. 10 is a schematic block diagram showing certain components and program conditions of the control unit.

A station line unit is shown in FIGS. 7, 8 and 9. The unit connects to I/O Bus 33 of control unit 7 and each unit has an I/O address (TERM), and is controlled via the IOT codes. In the Figures, the signal TERM·IOP$x$ is true when the I/O address (bits 3—8 of the IOT code, FIG. 6C) for the line unit is true, and the IOP$x$ pulse ($x$=1, 2, 4) occurs. The I/O addresses reserved for the stations are the set of eight octal codes 30 to 37 (i.e., IOT codes 630$x$ to 637$x$). See Control Codes—Station described hereinafter.

FIG. 7 is a functional block diagram of the input section of station line unit 8 and also of the interrupt clock. A 60 Hz clock 36 is connected to the "set" input of FF 37. The reset input of FF 37 is controlled by IOP2=6502. The "0" output of FF 37 goes to one input of AND gate 38, the second input of which is controlled by IOP1=6501. The "1" output of FF 37 is the interrupt request to the control unit 7.

Input data and the Monitor signal (simultaneous key closure) from the stations are connected to gates 40 of the line unit. The control signal for gates 40 is the output of AND gate 46. The STROBE signal (station key closure) is received by multivibrator OS 42 and is converted to a pulse which is fed to one input of AND gate 46 and the "set" input of flip-flop INSR 41. The reset of INSR 41 is controlled by the output of delay 45, which is also connected to the "clear" input of input register 39.

The "1" output of INSR 41 goes to one input of AND gate 43 and to the second input of AND gate 46. The second input of AND gate 43 is controlled by TERM·IOP1. The output of AND gate 43 is a command to load a "one" in bit 4 of ACC 31. TERM·IOP2 is fed to delay 45, one input of AND gate 100 and gates 44. The output of gates 44 goes to ACC 31 in the control unit 7.

The "0" output of INSR 41 goes to the second input of AND gate 100 so that a skip command is sent to the control unit 7 if INSR 41 is "reset" and the TERM·IOP2 signal occurs. This is an indication to control unit 7 that the station unit 2 interfacing with the station line unit 8 does not need servicing, since no key has been depressed which would cause INSR 41 to be "set."

FIG. 8 is a block diagram of the printer control section of line unit 8. Data from ACC 31 is fed to gates 49. Inputs $\overline{ACC\ 4}$ and TERM·IOP4 are the two inputs to AND gate 47, the output of which is connected to motor control 48 and gates 49. One output of motor control 48 goes to the printer motor at the station and the second output is supplied to clear a print register 50. The output of gates 49 is fed to the input of print register 50 and the output of print register 50 is connected to print drivers 51. Print drivers 51 are connected to drive the printer head in the associated station unit.

FIG. 9 is a block diagram of the display and alarm control section of line unit 8. Signal lines ACC 7—11, originating at ACC 31, are connected to the input of gates 53. ACC 4 and TERM·IOP4 are the two inputs to AND gate 52, the output of which is also connected to gates 53. Outputs from gates 53 are connected to the "set" input of FF 54, to one input of AND gate 58 and to one input of NAND gate 57. The "reset" input of FF 54 is connected to reset key 15 and the "1" output of FF 54 is connected to the station alarm.

The second input of NAND gate 57 is connected to a home sensing switch in the display section of station unit 2. The output of NAND gate 57 is the second input to AND gate 58, the output of which is used to trigger multivibrator OS 55. Display motor driver 56 receives its input from the output of OS 55 and in turn its output is connected to the respective display motor.

FIG. 9 shows the home and step circuits for one station display, it being understood that there are two similar circuits enabled by ACC 9 and ACC 11 for the other two displays.

Operation of the Line Unit

1. Input

The input section of line unit 2, is shown in FIG. 7, and transfers data from keyboard 5 to control unit 7. It contains an input register 39 which holds the character until control unit 7 is ready to accept it. When a key is depressed, the six bits of data are presented to the input gates 40 of input register 39. After the data has settled, keyboard 5 generates a STROBE pulse which will load the data into input register 39. If more than one key is depressed at this time, the MON (Monitor) signal is generated by keyboard 5, and this signal causes all "ones" to be loaded into register 39 at STROBE time. The STROBE signal also sets the input service request flip-flop 41 (INSR) via monostable multivibrator 42.

The loading of input register 39 is accomplished by enabling gates 40 when an output is received from AND gate 46, due to the presence at the inputs of AND gate 46 of a STROBE pulse as modified by one-shot 42 and a signal from INSR 41 that it is set.

With the loading of input register 39 complete and the INSR FF 41 "set" the station line unit waits for interrupt FF 37. When FF 37 is "set" its "1" output is the interrupt signal to control unit 7. The control unit 7 now generates an IOP1 signal with address TERM=63×1 which is sent to AND gate 43. Since INSR 41 is "set" AND gate 43 produces an output which causes a "1" to be loaded in bit 4 of ACC 31. This "1" in ACC 31 must settle before an IOP2 signal will be sent to the station line unit 8.

Note that if this particular station did not need servicing INSR 41 would have been in the "reset" condition when the IOP2 signal arrived and therefore a SKIP signal would have appeared at the output of AND gate 100.

Control unit 7 can now issue IOT code 63×2 (TERM·IOP2), which will permit loading of the contents of input register 39 into accumulator 31 of the control unit and, after an appropriate delay (if required), clear input register 39 and INSR flip-flop 41. The instruction (TERM·IOP2) thus enables gates 44 to transfer the information in register 39 to accumulator 31. The same instruction is delayed by delay 45 and then clears input register 39 and resets INSR 41.

While the INSR flip-flop 41 is set, input gates 40 to input register 39 are locked out to prevent overwriting of the current character.

Interrupt FF 37 can be tested by IOT code 6501, which will cause the SKIP line of the computer to be energized if FF 37 is reset. IOT code 6502 will clear or "reset" FF 37.

2. Operation of the Printer Section

The output section of station line unit 8 (FIGS. 8, 9) services printer 4, display units 3, and alarm 9.

Referring to FIG. 8, when control unit 7 services the output section, it places a print column command or a display/alarm command in bits 5—11 of accumulator 31. It then uses bit 4 to specify the type of command as follows:

| ACC 4 | Command |
|---|---|
| 0 | Print |
| 1 | Display and Alarm |

The printer section contains a 7-bit print register 50 which holds the 7-bit matrix column currently being printed. Print register 50 drives a set of print drivers 51, each of which appropriately pulses its corresponding print finger if the associated bit of the print register 50 is set.

Print register 50 is loaded via gates 49 with the data in bits 5—11 of accumulator 31 on the IOT code 63×4, *if* bit 4 of accumulator 31 is "zero" (TERM·IOP4·$\overline{ACC\ 4}$). The AND gate 47 permits loading when both conditions are satisfied The load pulse also triggers the motor control circuits 48 which steps the paper strip one column, and, after the column has been printed, clear print register 50. Note that the paper must be advanceable one *column* at a time (rather than one character at a time) due to potential control unit 7 processing delays.

3. Operation of the Display and Alarm Section

Referring to FIG. 9, the bits from accumulator 31 have the following meaning:

| ACC Bit | Function |
|---|---|
| 7 | Set Alarm |
| 8 | Home Displays |
| 9 | Step Left Display |
| 10 | Step Center Display |
| 11 | Step Right Display |

When bit 4 of accumulator 31 is "one," *and* the IOT code 63×4 is issued (TERM·IOP4·ACC 4), then bits 7—11 are presented to the display and alarm logic, via gates 53 rather than to print register 50. The AND gate 52 performs this function. If bit 7 is set, the alarm flip-flop 54 (ALM) is set. It is cleared by RESET key 15 (which must therefore generate a separate signal in addition to its 6-bit code).

If bit 10 is set, then one-shot 55 controlling the center display is triggered, causing display driver 56 to step that display one position. Bits 9 and 11 and similar circuitry control the other two displays.

If the home bit (bit 8) is set, then a display is stepped only if it is not yet in its home position. When it reaches its home position, it generates the HOME*n* signal ($n$=1, 2, 3), which causes input gate 57 to one-shot 55 to be disabled [i.e., STEP $1 = (\mathrm{TERM}\cdot\mathrm{IOP4}\cdot\mathrm{ACC}\ 4)(\mathrm{ACC}\ 10)(\overline{\mathrm{AC}\ 8\cdot\mathrm{HOME}\ 2})$]. Thus, to home a display, the control unit issues 12 step commands with the home bit (bit 8) set.

Teletypewriter Line Unit

Teletypewriter line unit 10 (FIG. 13) allows the connection of a teletypewriter line to control unit 7 via I/O Bus 33. Up to four teletypewriter lines may be connected, each with its own line unit.

Line unit 10 utilizes conventional techniques to provide all the functions of asynchronous character assembly and disassembly, bit and character timing, communication line interface, and I/O Bus interface. Two device addresses are required for each line unit. Therefore, six IOT codes are assigned for teletypewriter line unit control:

| | |
|---|---|
| 640X, 642X, 644X, 646X | Control input section of line 1, 2, 3, 4 respectively |
| 641X, 643X, 645X, 647X | Control output section of line 1, 2, 3, 4 respectively |

The IOT codes for the first line are:

| | |
|---|---|
| 6401 | Skip if input flag is up (input character from TTY line unit to control unit is ready). |
| 6402 | Clear input flag, and load input character into low part of ACC 31. Start and stop bits are not loaded into ACC 11. Note: ACC 31 is not cleared by this IOT code. |
| 6411 | Skip if output flag is up (line unit 10 is ready for another character). |
| 6412 | Clear output flag. |
| 6414 | Load character from ACC 31 into output line unit. Character format is same as for input. |

The input register 109 in TTY line unit 10 may be cleared by IOT code 6402 (6422, 6442, 6462) after an appropriate delay, or by the start bit of the next character.

The TTY line unit 10 receives data from ACC 31 and stores it in TTY output register 105 when the IOT code 6414 (for the first TTY line unit) is received. An output clock 106 then sends the stored data to a teletypewriter 107. The teletypewriter 107 can send data to TTY input register 109 where it is entered by input clock 108. On the IOT command 6402 ACC 31 loads the data from TTY input register 109 into message buffer 110 of core 26.

The teletypewriter may be of conventional structure with the following special adjustments:

a. The input and output clocks are adjustable from 50 to 110 bits per second. (Input and output clocks for all lines will always be at the same rate. Thus, a common clock source may be used if desired).

b. The stop interval is setable to either 1.5 or 2.0 bit times.

c. The character length is set to 8 bits, plus start and stop bits.

d. Line unit 10 can be connected to either a half-duplex or a full-duplex teletypewriter line. In the half-duplex mode, reception of its own transmitted information is inhibited.

e. The teletypewriter line interface may be any of the following:

1. EIA RS-232 (±6 volt).
2. 60 m., 120 volt unipolar loop.
3. 60 m., 120 volt bipolar loop.

The teletypewriter line preferably is capable of receiving in the presence of 35 percent telegraphic distortion and of transmitting characters with less than 5 percent telegraphic distortion.

Figure 13:
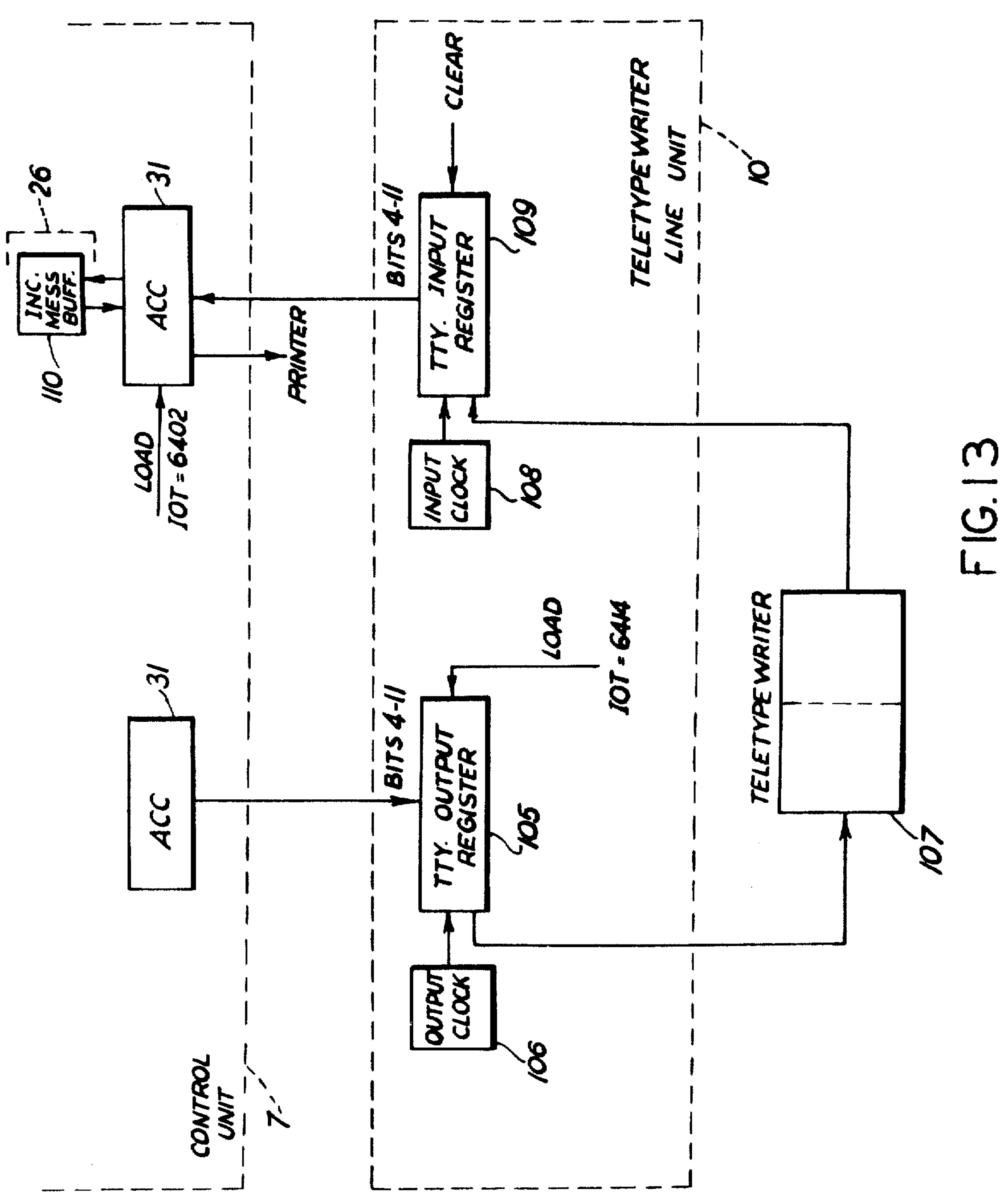
FIG. 13 is a schematic block diagram of a teletypewriter line unit.

For print out of incoming messages originating at station 107, and stored in buffer 110, FIG. 13, the contents of 110 are supplied to the terminal printer via ACC 31 when the printer is accessible for message reproduction.

In the event a start of message sequence does not ultimately evoke a reply from station 107, the absence of that reply is detected in control unit 7 utilizing ACC 31. This causes the latter to supply a suitable indication, e.g. "NO TTY AVAILABLE" at the station printer.

Hardware/Software Interface

There are three main areas of hardware/software interfacing, code structures, control codes (IOT's), and timing.

Keyboard Codes

Table IV gives the codes used by the Terminal Keyboard and relates it to the ASCII code used on some of the teletypewriter lines. These codes are given in octal as they appear in accumulator 31 for reception or transmission. The keyboard code is directly suitable for internal storage, packing two 6-bit characters to a word.

TABLE IV

Keyboard and ASCII Codes

| Character | Keyboard (and Internal) Code | ASCII Code |
|---|---|---|
| A | 01 | 101 |
| B | 02 | 102 |
| C | 03 | 303 |
| D | 04 | 104 |
| E | 05 | 305 |
| F | 06 | 306 |
| G | 07 | 107 |
| H | 10 | 110 |
| I | 11 | 311 |
| J | 12 | 312 |
| K | 13 | 213 |
| L | 14 | 314 |
| M | 15 | 115 |
| N | 16 | 116 |
| O | 17 | 317 |
| P | 20 | 120 |
| Q | 21 | 321 |
| R | 22 | 322 |
| S | 23 | 123 |
| T | 24 | 324 |
| U | 25 | 125 |
| V | 26 | 126 |
| W | 27 | 327 |
| X | 30 | 330 |
| Y | 31 | 131 |
| Z | 32 | 132 |
| SPACE | 33 | 220 |
| 0 | 60 | 060 |
| 1 | 61 | 261 |
| 2 | 62 | 262 |
| 3 | 63 | 063 |
| 4 | 64 | 264 |
| 5 | 65 | 065 |
| 6 | 66 | 066 |
| 7 | 67 | 267 |
| 8 | 70 | 270 |
| 9 | 71 | 071 |
| %(!) | 50 | 041 |
| %(41 ) | 51 | 042 |
| %(0) | 52 | 243 |
| %(') | 53 | 047 |
| %(() | 54 | 050 |
| %()) | 55 | 251 |
| % (=) | 56 | 275 |
| EVEN | 57 | |
| / | 72 | 257 |
| \ | – | 134 |
| - | 73 | 055 |
| XMIT | 74 | |
| RESET | 75 | |
| I | 34 | |
| II | III 36 | |
| IV | 37 | |
| V | 40 | |
| VI | 41 | |
| VII | 42 | |
| VIII | 43 | |
| IX | 44 | |
| X | 45 | |
| ILLEGAL | 77 | |

Printer Codes

The printer matrix codes are given in Table V. Following each printed character of five columns, there is printed one blank column as an intercharacter space.

Table V shows the column code as it appears in accumulator 31 prior to transmission to station line unit 8. The five columns are transmitted in the order indicated by the Table to achieve the given character.

TABLE V

Printer Code

| | Received character sequence | | | | |
|---|---|---|---|---|---|
| | 1st | 2nd | 3rd | 4th | 5th |
| Printed character: | | | | | |
| A | 176 | 021 | 021 | 021 | 176 |
| B | 177 | 111 | 111 | 111 | 066 |
| C | 076 | 101 | 101 | 101 | 042 |
| D | 177 | 101 | 101 | 101 | 076 |
| E | 177 | 111 | 111 | 111 | 101 |
| F | 177 | 021 | 021 | 021 | 001 |
| G | 076 | 101 | 101 | 111 | 171 |
| H | 177 | 010 | 010 | 010 | 177 |
| I | 000 | 101 | 177 | 101 | 000 |
| J | 000 | 040 | 100 | 100 | 077 |
| K | 177 | 010 | 024 | 042 | 101 |
| L | 177 | 100 | 100 | 100 | 100 |
| M | 177 | 002 | 034 | 002 | 177 |
| N | 177 | 002 | 004 | 010 | 177 |
| O | 076 | 101 | 101 | 101 | 076 |
| P | 177 | 011 | 011 | 011 | 006 |
| Q | 076 | 101 | 121 | 041 | 136 |
| R | 177 | 011 | 031 | 051 | 106 |
| S | 106 | 111 | 111 | 111 | 061 |
| T | 001 | 001 | 177 | 001 | 001 |
| U | 077 | 100 | 100 | 100 | 077 |
| V | 017 | 060 | 100 | 060 | 017 |
| W | 077 | 100 | 074 | 100 | 077 |
| X | 143 | 024 | 010 | 024 | 143 |
| Y | 007 | 010 | 160 | 010 | 007 |
| Z | 141 | 121 | 111 | 105 | 103 |
| 1 | 000 | 002 | 177 | 000 | 000 |
| 2 | 102 | 141 | 121 | 111 | 106 |
| 3 | 040 | 101 | 111 | 115 | 163 |
| 4 | 030 | 024 | 022 | 175 | 020 |
| 5 | 047 | 105 | 105 | 105 | 071 |
| 6 | 074 | 102 | 111 | 111 | 060 |
| 7 | 001 | 001 | 161 | 015 | 003 |
| 8 | 066 | 111 | 111 | 111 | 066 |
| 9 | 006 | 111 | 111 | 051 | 036 |
| 0 | 076 | 101 | 105 | 103 | 077 |
| | 002 | 004 | 010 | 020 | 040 |
| $ | 106 | 011 | 177 | 111 | 061 |
| /* | 052 | 034 | 177 | 034 | 052 |
| /'' | 000 | 007 | 000 | 007 | 000 |
| /: | 000 | 000 | 124 | 060 | 000 |
| & | 060 | 113 | 125 | 043 | 120 |
| Box | 101 | 076 | 042 | 076 | 101 |
| Space | 000 | 000 | 000 | 000 | 000 |
| | 000 | 010 | 024 | 042 | 000 |
| % | 040 | 020 | 052 | 004 | 002 |
| | 000 | 042 | 024 | 101 | 000 |
| # | 024 | 177 | 024 | 177 | 024 |
| @ | 076 | 135 | 125 | 135 | 116 |
| : | 000 | 000 | 110 | 000 | 000 |
| = | 024 | 024 | 024 | 024 | 024 |
| ' | 000 | 000 | 137 | 000 | 000 |
| /- | 010 | 010 | 010 | 010 | 010 |
| + | 010 | 010 | 076 | 010 | 010 |
| ? | 002 | 001 | 001 | 131 | 006 |
| ) | 000 | 101 | 076 | 000 | 000 |
| ( | 000 | 000 | 076 | 101 | 000 |
| / | 040 | 020 | 010 | 004 | 002 |
| /. | 000 | 000 | 100 | 000 | 000 |
| /, | 000 | 000 | 120 | 060 | 000 |
| /' | 000 | 000 | 007 | 000 | 000 |
| ⊡ | 177 | 101 | 111 | 101 | 117 |
| Solid block | 177 | 177 | 177 | 177 | 177 |

Control Codes—Station

IOT codes 630X to 637 are reserved for eight stations. The IOT codes for the first station (630X) are shown below:

| Code | Function |
|---|---|
| 6301 | Skip the next instruction if the input flag (flip-flop) is set. |
| 6302 | Read keyboard character into ACC 6—11. Clear Input Register and input flag. |
| ACC 4 = 0 | |
| 6304 | Load ACC 5—11 into Print Register. |
| ACC 4 = 1 | |
| 6304 | Transfer ACC 7—11 to display and alarm logic. |

For printing, displaying, and alarming, the accumulator is used as hereinbefore described. ACC 4 specifies whether the contents of the accumulator are a print column (ACC 4=0), or display and alarm commands (ACC 4=1). If the latter, ACC 7 will set the alarm, ACC 8 specifies homing of the displays, and ACC 9, 10, and 11 will cause the left, center, and right display, respectively, to be set.

Teletypewriter Line Unit

IOT codes 640X to 647X are reserved to handle up to four teletypewriter lines. The IOT codes for the first line are shown below:

| Code | Function |
|---|---|
| 6401 | Skip the next instruction if the input flag (flip-flop) is set. |
| 6402 | Clear the input flag, and load the input character into the low part of ACC 31. |
| 6411 | Skip the next instruction if the output flag is set. |
| 6412 | Clear the output flag. |
| 6414 | Transmit the character contained in ACC 31. |

Interrupt Clock

| Code | Function |
|---|---|
| 6501 | Skip the next instruction if the interrupt FF 37 flag is not up. |
| 6502 | Clear the interrupt FF 37 flag. |

Console

The 8-level paper tape reader in the console has the following instructions:

| Code | Function |
|---|---|
| 6031 | Skip the next instruction if the reader flag (flip-flop) is up. |
| 6032 | Clear the reader flag, and load the character into ACC 4—11. Begin the Fetch of the next character. |

The IOT code 6032 may also be implemented as 6036, since IOP4 is not used. 6036 does the same function as the KRB code (6036) of a PDP-8 computer, except that accumulator 31 is not cleared by the IOT code. Using 6036 instead of 6032 will allow the loader program to be tested on a PDP-8.

Timing

The interrupt clock 36 flags the computer 60 times per second. This is the column printing rate required to achieve a printing rate of 10 characters per second.

At each clock time, the printer(s) may be given a new column to print. On every sixth clock time, the display(s) may be given a new command.

The input(s) are tested at least every third clock time (20 times per second).

The teletypewriter line unit(s) are tested for input and output requests on every third clock time (20 times per second).

CONTROL UNIT SOFTWARE

This section of the specification describes control unit 7 software that forms the framework for the format list that implements a given terminal application.

Program Organization

A diagram of the organization of the control unit program is shown in FIG. 10 wherein a series of buffers are shown. Physically, the buffers comprise the accumulator 31 and the core 26 and its buffers programmed to service the stations and communication lines.

Thus, the INT program enters data into keyboard buffer 61 and receives data from printer buffer 62 and display buffer 63. The INPRC program takes data from KYBD buffer 61 and enters appropriate responses in PRTR buffer 62 and DISP buffer 63 as well as storing the data in intermediate storage buffer 65. The OUTPRC program takes data from intermediate storage buffer ISBUF 65 and enters it in the teletypewriter buffer TTYBUF 64, the output of which is connected to a teletypewriter line unit via the accumulator 31.

Data is transferred into and out of the buffers via accumulator 31 and the I/O Bus 33. An incoming character is placed on I/O Bus 33 and the interrupt line is energized. This causes control unit 7 to store the character in accumulator 31 and then store it in a buffer register of memory 26. Likewise, to send a character out, control unit 7 moves the character from its buffer register in memory unit 26 to accumulator 31. It will then generate the appropriate control codes on I/O Bus 33 so that the desired output unit will accept and act on the character in accumulator 31.

The buffers and their function are as follows:

a. Keyboard Buffer—There is one keyboard buffer 61. It stores incoming characters (one character per word) from keyboard 5 for later processing. It has associated with it a rotating input and output pointer which indicate where the next character will be entered from keyboard 5 (KINPTER), or taken for processing (KOTPTR). The size of keyboard buffer 61 is eight characters.

b. Printer Buffer—There is one printer buffer 62. It contains the sequence of characters (one character per word) to be transmitted to the home copy strip printer 4 of station 2. It has associated with it a rotating input pointer (PINPTR) to indicate where the next character will be placed, and a rotating output pointer (POTPTR) to indicate from where the next character will be taken for printing. It also has a column counter (COLCTR) to keep track of the next matrix column to be printed. The printer buffer 62 size is 64 characters.

c. Display Buffer—There is one display buffer 63. Actually, display buffer 63 is two sets of three 4-bit counters (HOMCTR and DSPCTR) containing the number of steps that each display is to be rotated for homing (HOMCTR) or normal display (DISPCTR). In addition, an ALM bit indicates when an alarm character should be sent to the terminal.

d. Intermidiate Storage Buffer—The intermediate storage buffers 65 are used to build up a properly formatted message for transmission over communication line 6. There are two such buffers. The size of the intermediate storage buffer is 250 characters.

e. Teletypewriter Buffer—The teletypewriter buffer 64 contains the sequence of characters to be sent to the teletypewriter line 6.

Programs

The system programs stored in control unit 7 include:

- INT The interrupt program. It decides what task is to be done next, moves characters into the keyboard buffer 61 and sends characters and data to the station printer 4 and displays 3, and to the teletype machines.
- INPRC The list processor is the keystone of the program technique. It assigns an idle intermediate storage buffer 65 to the station and processes the subsequent data received from the keyboard 5 according to the format list stored in core. It checks the validity of the input character (as previously described), returns home copy to the printer 4, controls the displays 3, and builds properly formatted messages in the intermediate storage buffers 65. When a properly formatted message is received, intermediate storage buffer 65 is set to the full status for OUTPRC.
- OUTPRC The output processor moves data from a full intermediate storage buffer 65 to the teletypewriter buffer 64 for transmission to the teletypewriter.

Data Flow

Reference to FIG. 10 will help in understanding the data flow through the system. Initially, the intermediate storage buffers 65 are empty, and the station displays 3 are set to an initial state. When a key on a keyboard 5 is depressed, it will be entered into its keyboard buffer 61 by the INT program.

The List Processor (INPRC) will pick up this character, assign an intermediate storage buffer (ISBUF) 65, and examine the character for validity. If it is valid, it will store it (or an equivalent message) in the assigned ISBUF 65, and queue up an appropriate printer response in the printer buffer 62. If the displays 3 need to be changed, INPRC will increment the counters in the display buffer 63 appropriately. The printer 4 and display 3 character sequences will be transmitted to station 2 by the INT program.

The process continues until either a valid terminating XMIT character is received (via the depression of the Transmit key 16), or an invalid character is received. In the former case, ISBUF 65 is flagged as full, and released from the terminal. If an invalid character has been received, INPRC will energize the station alarm 17, actuate the ERROR indicators, and print the invalid character. The invalid character is not stored in ISBUF 65. Upon receipt of the RESET character, the station alarm 17 is cleared (by hardware), the ISBUF 65 is cleared and released, and the displays 3 are initialized.

The INPRC program will continue to assign intermediate storage buffers 65 to a requesting keyboard 5 until there are no more idle buffers 64. At this point, it will ignore characters from keyboard 5 until an idle buffer 64 becomes available. Thus, an operator will find his station 2 "dead" when there are no intermediate storage buffers 65 available for him. It will suddenly respond to his first entered character when a buffer 65 is assigned to his station 2.

TYPICAL SYSTEM OPERATION

Figure 12:
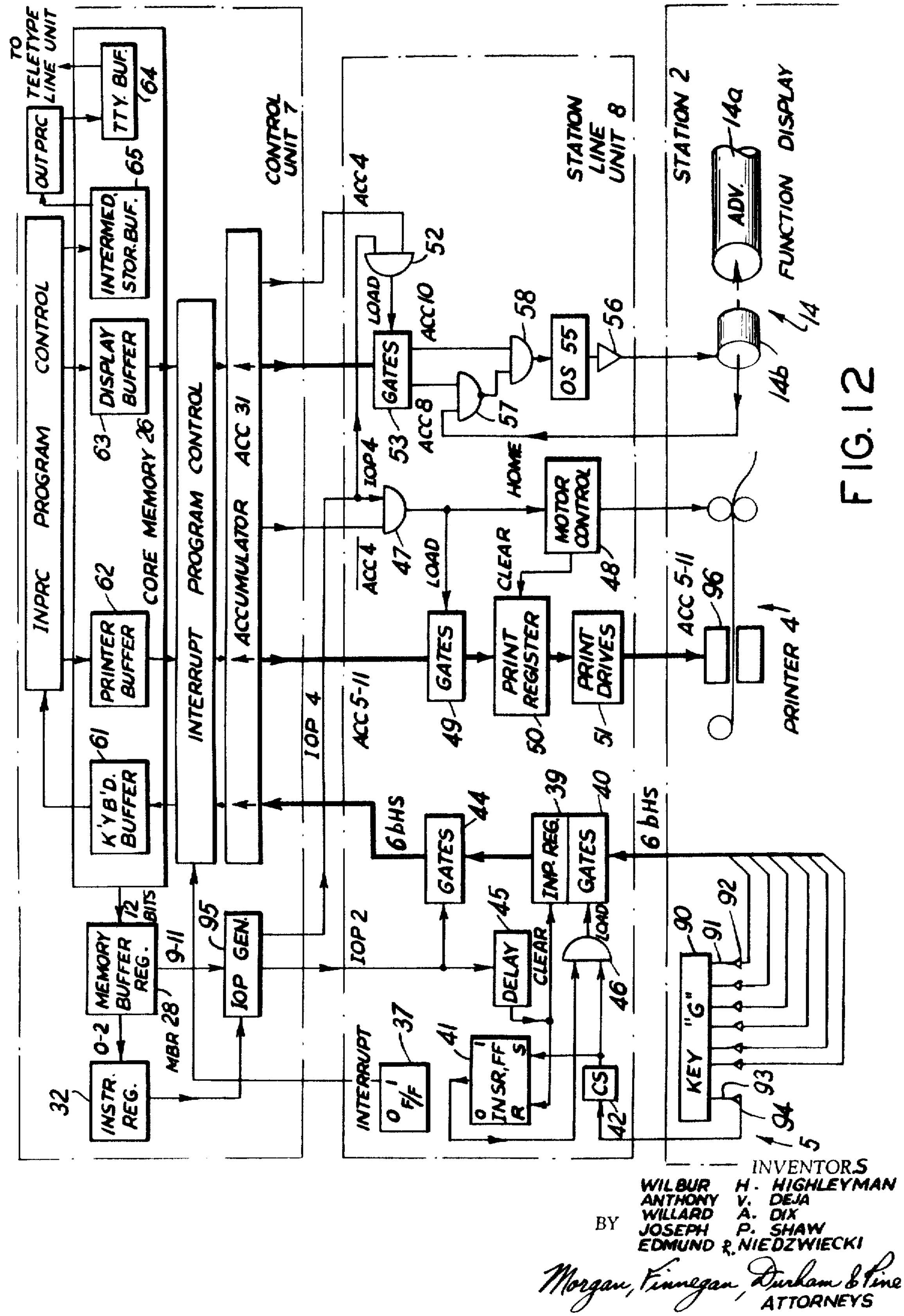
FIG. 12 is a schematic block diagram illustrating certain aspects of overall system operation resulting from depression of a single key, including the circuits involved and applicable data flow.

FIG. 12 shows the system response to the depression of key 90 ("G") at step 6 in the transaction illustrated by FIG. 3. System operation is as follows.

When the operator depresses key 90 fingers 91 will touch contacts 92. In FIG. 12 six fingers 91 and six contacts 92 are shown. However, to generate a 6-bit code corresponding to the symbol "G" represented by key 90 either some of the fingers 91 or some of the contacts 92 will be deleted. Upon closure between fingers 91 and contacts 92, a DC level will appear at gates 40 of line unit 8, which gates function as the input control for input register 39.

As the operator continues to depress key 90 a seventh finger 93 will close with contact 94 thereby triggering one shot 42 in the line unit. The output from one shot 42 sets FF 41 and also goes to one input of AND gate 46.

When FF 41 is set the "1" output of FF 41 appears at AND gate 46 thereby causing an output from AND gate 46 which causes the data present at gates 40 to be loaded into input register 39.

The station line unit 8 now waits for the interrupt clock 36 (see FIG. 7) to "set" interrupt FF 37 which energizes the interrupt line to control unit 7. The function of the IOP1 signal was described in connection with FIG. 7 and will not be detailed again here.

With the interrupt line energized, the interrupt program causes a 12 -bit instruction word to be read from memory 26 to MBR 28. MBR 28 operates on this instruction word and sends bits 0—2 to instruction register 32 where they are decoded and sent to IOP generator 95. MBR 28 also sends bit 10 to IOP generator 95 and an IOP2 signal is then sent to gates 44 causing the 6 -bits of data stored in input register 39 to be transferred to accumulator 31. The IOP2 signal is delayed for a short time in delay 45 and is then used to clear input register 39 and reset FF 41.

The interrupt program then transfers the data from ACC 31 to keyboard buffer 61 in memory 26. The INPRC program then examines the data stored in buffer 61 to test the character for validity. The description of the validity check sequence for an input character was described earlier in connection with the Fetch and Execute major states p. 31. Since the character is valid, it is stored in intermediate storage buffer 65 and, under OUTPRC control, ultimately fed to the teletypewriter line unit via the TTY buffer 64. Since this character is to be printed, the INPRC program enters an instruction in printer buffer 62 to that effect. In addition, because it is necessary for purposes of operator guidance to advance function display 14 one increment, the INPRC program enters an instruction to that effect in the display buffer 63.

The interrupt program now comes into play by transferring the print instruction from printer buffer 62 to accumulator 31. An IOP4 pulse is now generated in IOP generator 95 using the outputs from instruction register 32 and bit 9 from MBR 28. Since ACC 31 is storing information corresponding to one column of print data, bit 4 of ACC 31 is zero, i.e., $\overline{\text{ACC 4}}$. When the IOP4 signal arrives at AND gate 47 an output is produced which causes the print data in ACC 31 to be transferred by gates 49 to print register 50. Print drives 51 use the data stored in print register 50 to drive print head 96 to print one column of the character "G."

The output of AND gate 47 is also fed to motor control 48 which advances paper drive motor 97 one column after the first column is printed. Motor control 48 also clears print register 50 so that it can receive the next column of print data. This process is repeated four more times to generate the full character "G."

The interrupt program is also responsible for display control. Therefore it transfers the display advance instruction in display buffer 63 to ACC 31 and causes an IOP4 signal to be generated as previously described. Since ACC 31 now holds data which is to be used to control the displays, bit 4 of ACC 31 is a one, i.e., ACC 4. When the IOP4 signal is generated an output is produced at AND gate 52 which causes bit 10 of ACC 31 to be transferred to AND gate 58.

NAND gate 57 has two inputs, one signifying when function display 14 is in the HOME position and the other being ACC 8, the HOME bit. Since the order to function display 14 is to advance one step rather than to HOME, bit 8 of ACC 31 is zero. Therefore, since both inputs to NAND gate 57 are not "1," the output of the NAND gate is "1" and since ACC 10 is "1" there is an output from AND gate 58 when the IOP4 signal is received which triggers one shot 55. The output of one shot 55 is amplified by display motor driver 56 and then used by display motor **14*b* to advance display 14*a*** to "ADV."

What we claim is:

1. Data processing system for generating data signals and organizing said data signals according to a predetermined format for coupling to a transmission network comprising:
   1. guidance display means having a plurality of operator guidance indicia,
   2. local recording means for displaying and recording said data,
   3. a plurality of multifunction keys adapted to be actuated by an operator, each for generating a plurality of different data representations,
   4. control means including
      a. a key responsive recording control circuit connected to respond to said keys for actuating said local recording means,
      b. a guidance display control circuit connected to respond to said keys for controlling the states of said operator guidance display means,
      c. an output storage circuit connected to respond to said display control circuit and to said keys for storing the data defined by said keys for subsequent transmission on said transmission network,
      d. an error detector circuit connected to compare said key data representations with signals related to said guidance display states to detect the improper actuation of said keys,
      e. an alarm and transmission control circuit responsive to said error detector circuit and connected to prevent said transmission and to actuate an alarm; and
   5. transmission means operable to transmit the contents of said output storage circuit to said transmission network, said transmission means being connected to said alarm and transmission control circuit to be conditioned for operation in the absence of improper key operation.

2. A system as defined in claim 1 in which said key responsive recording control circuit includes memory means for storing key data, arithmetic means for checking the correctness of said data, and register means interconnecting said memory means, said arithmetic means and said local recording means.

3. A system as defined in claim 1 in which said alarm and transmission control circuit includes a shift register, a flip-flop and an indicator interconnected for rendering said indicator responsive to said flip-flop and for rendering said flip-flop responsive to error data contained in said register.

4. A system as defined in claim 1 in which said error detector circuit includes memory means for storing allowable key data representations, a first shift register connected to sequentially receive the allowable key data representations from said memory means, a second shift register connected to store a key data representation from one of said keys, means interconnecting said first and second registers so that the contents of said first register may be compared with the contents of said second register, and means responsive to the result of said comparison to activate said error detector circuit when no successful comparison is achieved.

5. A system as defined in claim 1 in which said guidance display means includes a rotatable segmented indicator.

6. A system as defined in claim 1 in which said guidance display means are physically disposed relative to said multifunction keys so as to indicate which of said keys may be utilized to generate said data representations.

7. A system as defined in claim 1 in which said guidance indicia are organized into a plurality of sets of indicia, at least one said set having a plurality of data representations.

8. A system as defined in claim 7 in which said guidance display means includes a rotatable segmented indicator.

9. A system as defined in claim 7 in which said guidance display control circuit includes means for sequentially presenting said sets for viewing by an operator.

10. A system as defined in claim 9 wherein said means for sequentially presenting said sets includes stepping means.

11. Data processing system for generating data signals and organizing said data signals according to a predetermined format for coupling to a transmission network comprising:
   1. guidance display means having a plurality of operator guidance indicia,
   2. a plurality of multifunction keys adapted to be actuated by an operator, each for generating a plurality of different data representations,
   3. control means including
      a. a guidance display control circuit connected to respond to said keys for controlling the states of said operator guidance display means,
      b. an output storage circuit connected to respond to said display control circuit and to said keys for storing the data defined by said keys for subsequent transmission on said transmission network,
      c. an error detector circuit connected to compare said key data representations with signals related to said guidance display states to detect the improper actuation of said keys,
      d. a transmission control circuit responsive to said error detector circuit and connected to prevent said transmission; and
   4. transmission means operable to transmit the contents of said output storage circuit to said transmission network, said transmission means being connected to said transmission control circuit to be conditioned for operation in the absence of improper key operation.

12. A system as defined in claim 11 in which said error detector circuit includes memory means for storing key data, arithmetic means for checking the correctness of said data, and register means interconnecting said memory means and said arithmetic means.

13. A system as defined in claim 11 in which said guidance display means includes a plurality of rotatable, segmented indicators.

14. A system as defined in claim 11 in which said guidance means includes an indicia field and means for sequentially displaying portions of said field to an operator.

15. A system as defined in claim 14 in which said portions of said field which are sequentially viewable are oriented relative to said multifunction keys to define the current function of said keys.

16. Data processing system for generating data and organizing said data according to a predetermined format for coupling to a transmission network comprising:

1. an operator terminal having:
   a. display means for displaying a plurality of operator guidance indicia,
   b. a plurality of keys adapted to be actuated by an operator, each for generating data representations,
2. control means for controlling the operation of said terminal and the transmission of data generated at said terminal over said network, said control means including:
   a. a memory having an instruction data storage section and a processed data storage section, said instruction data storage section including data representations defining said format, and said processed data storage section including (i) a first subsection for storing signals indicative of key data, (ii) a second subsection for storing control signals for said display means, and (iii) a third subsection for storing signals indicative of the data to be transmitted,
   b. register means controlling the transfer of instruction and processed data signals to and from said memory,
   c. arithmetic means coupled to said register means for processing said processed data in response to said instruction data,
   d. means coupling said key data signals to said arithmetic means from said first subsection, 17. A system as defined in claim 16 in which said operator terminal includes error indicating means and in which said control means includes means for interconnecting said error indicating means and said arithmetic means in the presence of incorrect key data.

18. A system as defined in claim 17 in which said means for interconnecting said error indicating means and said arithmetic means includes a gated register connected to said arithmetic means and means connected to said register and responsive thereto and further connected to said error indicating means for controlling said error indicating means.

19. A system as defined in claim 16 wherein said keys include a plurality of multifunction keys adapted to be actuated by an operator, each for generating a plurality of different data representations.

20. A system as defined in claim 16 in which said guidance indicia include a plurality of sets of indicia, at least one of said sets having a plurality of data representations.

21. A system as defined in claim 16 in which said display means includes a rotatable segmented display.

22. A system as defined in claim 16 in which said keys include a set of alphabetic keys, a set of numeric keys and a set of multifunction keys, and in which said display means includes a plurality of displays, at least one of said displays being associated with each said set of keys and physically disposed relative to said set of keys so as to permit visual correlation by an operator between said set of keys and said guidance indicia presented by said display.

23. A system as defined in claim 16 in which said means for controlling said arithmetic means in accordance with said format representing signals to check the correctness of said key data signals includes said storage data sections of said memory in which are stored memory reference instructions and operate instructions which define a set of permissible key data signals.

24. A data processing terminal unit for use in generating data signals and in guiding the operator of said terminal in said data signal generation comprising:

1. a keyboard including a plurality of multifunction keys,
2. at least one dynamic display,
3. said display having a plurality of display states capable of being sequentially presented to said operator for guiding said operator,
4. certain states of said display including a plurality of display indicators corresponding to permissible operator selections, and
5. certain of said indicators being spacially associated with certain multifunction keys of said keyboard for indicating the particular one of a plurality of functions which may be performed by said function keys upon actuation thereof.

25. A terminal unit according to claim 24 which includes at least one alarm indicator connected to operate in the presence of key manipulation which is inconsistent with the permissible operator selections as defined by the state of said dynamic display.

26. A terminal unit as defined in claim 24 including means operably associated with said display for defining the currently operable state of said display to thereby indicate the permissible operator selections.

27. A terminal unit as defined in claim 24 in which said keyboard includes alphabetic and numeric keys, and dynamic displays associated therewith for guiding said operator.

28. A terminal unit as defined in claim 24 which includes hard copy printing and display means comprising strip printing means including an electrolytic printer.

29. A terminal unit as defined in claim 24 including motive means for controlling the position of said display to thereby indicate the currently operable state of said display and thereby define the permissible operator selections.

30. A terminal unit as defined in claim 29 wherein said motive means comprises electromagnetic stepping means.

31. A terminal unit as defined in claim 24 in which said display comprises a rotatable cylinder bearing a plurality of legends in rows corresponding to the states of said display, each said row defining a set of operator selections.

32. A terminal unit as defined in claim 2 in which said display comprises means forming a field of guidance indicia having rows corresponding to said states, the columns in one of said rows corresponding to said display indicators.

33. A system for the generation of data according to a predetermined format and the transmission of said data to a remote terminal comprising:

1. an input terminal adapted for operation by an operator and having data generating means and format guidance means, said guidance means having a plurality of states, at least one said state having a plurality of guidance indicia;
2. a controller connected to said input terminal and including:
   a. digital control means; and
   b. output line unit means adapted for connection to a communication line;
3. said digital control means including:
   a. means for sequencing said states of said guidance means to guide said operator in the format of said generated data; and
   b. means for detecting the failure of said operator to follow said guidance means.

34. A system as defined in claim 33 in which said states comprise sets of indicia associated with a dynamic display means.

35. A system as defined in claim 33 which includes means responsive to said detected operator failure and disposed for appraising said operator of said failure.

36. A system as defined in claim 35 where said means for appraising said operator includes a printer connected for displaying data corresponding to said failure.

37. Data processing system for use in generating and processing data signals and in guiding the operator in said data generation and processing comprising:

1. guidance display means having a plurality of operator guidance states capable of being sequentially presented to an operator for guiding said operator in the generation and processing of said data;

2. local recording means for displaying and recording said data for viewing by said operator;
3. a plurality of multifunction keys adapted to be actuated by said operator, each for generating a plurality of different data representations in accordance with the indicated states of said guidance display means;
4. a plurality of data entry keys including said multifunction keys;
5. control means and data processing means including:
   a. a key responsive recording control circuit connected to respond to said keys for actuating said local recording means,
   b. a guidance display control circuit connected to respond to said keys for sequencing the states of said operator guidance display means,
   c. storage circuit connected to respond to said display control circuit and to said keys for storing the processed data,
   d. an error detector circuit connected to compare said key data representations with signals related to said guidance display states to detect the improper actuation of said keys, and
   e. an alarm circuit responsive to said error detector circuit and connected to alert said operator.

38. A system as defined in claim 37 in which said key responsive recording control circuit includes memory means for storing key data, arithmetic means for checking the correctness of said data, and register means interconnecting said memory means, said arithmetic means and said local recording means.

39. A system as defined in claim 37 in which said error detector circuit includes memory means for storing allowable key data representations, a first shift register connected to sequentially receive the allowable key data representations from said memory means, a second shift register connected to store a key data representation from one of said keys, means interconnecting said first and second registers so that the contents of said first register may be compared with the contents of said second register, and means responsive to the result of said comparison to activate said error detector circuit when no successful comparison is achieved.

40. A system as defined in claim 37 in which said states of said guidance display means are physically disposed parallel to said multifunction keys so as to indicate which of said keys may be utilized to generate said data representations.

41. A system as defined in claim 37 in which said guidance indicia are organized into a plurality of sets of indicia, at least one said set having a plurality of data representations.

42. A system as defined in claim 41 in which said multifunction keys form a linear array and in which said sets of guidance indicia are displayed in parallel relation of said array of multifunction keys.

43. Data processing system for use in generating and processing data signals and in guiding the operator in said data generation and processing comprising:
1. guidance display means having a plurality of operator guidance states capable of being sequentially presented to an operator for guiding said operator in the generation and processing of said data;
2. a plurality of multifunction keys adapted to be actuated by an operator, each for generating a plurality of different signals in accordance with the indicated states of said guidance display means;
3. a plurality of data entry keys including said multifunction keys
4. control means and data processing means including;
   a. guidance display control means connected to respond to said data entry keys for controlling the state of said operator guidance display means to sequentially present said operator with sets of permissible operator selections;
   b. storage means connected to respond to said control means and to said data processing means for storing the processed data, and
   c. error detector means connected to compare said key data entries with signals related to allowable key data entries to detect the improper actuation of said keys.

44. A system as defined in claim 43 in which said error detector means includes memory means for storing key data, arithmetic means for checking the correctness of said data, and register means interconnecting said memory means and said arithmetic means.

45. A system as defined in claim 43 in which said guidance display means includes an indicia field having a plurality of states, said multifunction keys are arranged in a linear array, and said states are sequentially presented to said operator in parallel relation to said array of multifunction keys.

46. Data processing system for use in generating and processing data and in guiding the operator in said data generation and processing comprising:
1. an operator terminal having:
   a. guidance display means for sequentially displaying sets of operator guidance indicia,
   b. a plurality of multifunction keys adapted to be actuated by an operator, each for generating a plurality of different data representations in accordance with said sets of indicia,
   c. a plurality of data entry keys;
2. control means for controlling the operation of said terminal and the processing of said data generated at said terminal said control means including:
   a. a memory having an instruction data storage section and a processed data storage section, said instruction data storage section including data representations defining said format, and said processed data storage section including (i) a first subsection for storing signals indicative of key data, (ii) a second subsection for storing control signals for said display means, and (iii) a third subsection for storing signals indicative of the stored data,
   b. register means controlling the transfer of instruction and processed data signals to and from said memory,
   c. arithmetic means coupled to said register means for processing said processed data in response to said instruction data,
   d. means coupling said key data signals to said arithmetic means from said first subsection,
   e. means included in said register means for controlling said arithmetic means in accordance with said format representing signals to check the correctness of said key data signals,
   f. means for transferring signals related to correct key data to said third subsection of said memory,
   g. means conditioned by said correct key data signals for storing display control signals in said second subsection, and
   h. timing means for transferring the contents of said second subsection of said memory to said display means.

47. A system as defined in claim 46 in which said means for controlling said arithmetic means in accordance with said format representing signals to check the correctness of said key data signals includes said storage data sections of said memory in which are stored memory reference instructions and operate instructions which define a set of permissible key data signals.

48. A data processing terminal unit for use in generating and processing data signals and in guiding the operator of said terminal in said data signal generation and processing comprising:
1. a keyboard including a plurality of alphabetic, numeric and multifunction keys;
2. dynamic display means spacially associated with said alphabetic, numeric and multifunction keys for guiding said operator in the actuation of said keys,
3. said display means having multiple display states capable of being sequentially presented to said operator for guiding said operator in the actuation of said keys consistent with the currently operable state:

a. at least one display state being associated with said alphabetic keys for guiding said operator in the entry of alphabetic data consistent therewith;

b. at least one display state being associated with said numeric keys for guiding said operator in the entry of numeric data consistent therewith;

c. a plurality of display state being associated with said multifunction keys, several of said states having a plurality of indicators being associated with particular ones of said multifunction keys for indicating the specific one of a plurality of functions which may be performed by each of said particular multifunction keys upon actuation thereof;

4. control means and data processing means including:

a. key responsive control circuit connected to respond to said keys;

b. guidance display control means connected to respond to said keys for controlling said display means to sequentially present said states of said display means to said operator to guide said operator in the generation and processing of said data;

c. error detector means connected to compare signals generated by actuation of said keys with signals related to said states of said display means to detect improper actuation of said keys.

49. A terminal unit as defined in claim 48 in which said display means includes a plurality of rotatable displays.

50. A terminal unit as defined in claim 48 which further includes storage means for storing processed data.

51. A terminal unit as defined in claim 48 in which said display control means includes preprogrammed digital control means for determining the sequence in which said states of said display means are to be presented to said operator.

52. A system for the generation and processing of data according to a predetermined format and the transmission of said data to a remote terminal comprising:

1. an input terminal adapted for operation by an operator and including:

a. data entry means including multifunction keys adapted for actuation by an operator, each for generating a plurality of different data representations, and b. format guidance means, said guidance means having a plurality of states capable of being sequentially presented to said operator, at least one said state having a plurality of guidance indicia;

2. a controller connected to said input terminal and including:

a. digital control means, and b. output line unit means adapted for connection to a communication line;

3. said digital control means including a. means for sequencing said states of said guidance means to guide said operator in the format of said generated data, b. means for detecting the failure of said operator to follow said guidance means, and c. means for processing said data generated in accordance with said guidance means.

53. Data processing system for generating and processing data signals and organizing said data signals according to a predetermined format for coupling a transmission network comprising:

1. guidance display means having a plurality of operator guidance states capable of being sequentially presented to an operator for guiding said operator in the generation and processing of said data;

2. a plurality of multifunction keys adapted to be actuated by an operator, each for generating a plurality of different data representations in accordance with the indicated states of said guidance display means;

3. control means for controlling the operation of said terminal and the transmission of data generated at said terminal over said network, said control means including:

a. a memory having an instruction data storage section and a processed data storage section, said instruction data storage section including data representations defining said format, and said processed data storage section including (i) a first subsection for storing signals indicative of key data, (ii) a second subsection for storing control signals for said display means, and (iii) a third subsection for storing signals indicative of the data to be transmitted, b. register means controlling the transfer of instruction and processed data signals to and from said memory, c. arithmetic means coupled to said register means for processing said processed data in response to said instruction data, d. means coupling said key data signals to said arithmetic means from said first subsection, e. means included in said register means for controlling said arithmetic means in accordance with said format representing signals to check the correctness of said key data signals, f. means for transferring signals related to correct key data to said third subsection of said memory, g. means conditioned by said correct key data signals for storing display control signals in said second subsection, h. timing means for transferring the contents of said second subsection of said memory to said display means, and i. means operable upon completion of the key generated data for translating said signals stored in said third subsection into signals for transmission over said network.